US007005206B2

(12) United States Patent
Lawrence et al.

(10) Patent No.: US 7,005,206 B2
(45) Date of Patent: Feb. 28, 2006

(54) FUEL CELL ASSEMBLY FOR PORTABLE ELECTRONIC DEVICE AND INTERFACE, CONTROL, AND REGULATOR CIRCUIT FOR FUEL CELL POWERED ELECTRONIC DEVICE

(75) Inventors: Craig Lawrence, Menlo Park, CA (US); Alexey Salamini, San Francisco, CA (US); Bruce MacGregor, Palo Alto, CA (US); David Bliven, Cupertino, CA (US)

(73) Assignee: Polyfuel, Inc., Menlo Park, CA (US)

( * ) Notice: Subject to any disclaimer, the term of this patent is extended or adjusted under 35 U.S.C. 154(b) by 259 days.

(21) Appl. No.: 10/161,558

(22) Filed: May 31, 2002

(65) Prior Publication Data

US 2002/0197522 A1 Dec. 26, 2002

Related U.S. Application Data

(60) Provisional application No. 60/295,114, filed on Jun. 1, 2001, provisional application No. 60/295,475, filed on Jun. 1, 2001.

(51) Int. Cl.
*H01M 2/00* (2006.01)
*H01M 8/04* (2006.01)

(52) U.S. Cl. ............................ 429/34; 429/23; 429/13; 429/6; 429/22; 429/25; 429/30

(58) Field of Classification Search .................. 429/34, 429/23, 13, 6, 22, 25, 30
See application file for complete search history.

(56) References Cited

U.S. PATENT DOCUMENTS

| | | |
|---|---|---|
| 3,013,908 A | 12/1961 | Luck et al. |
| 3,113,049 A | 12/1963 | Worsham |
| 3,368,922 A | 2/1968 | Salyer |
| 4,192,907 A | 3/1980 | Jalan et al. |
| 4,242,421 A | 12/1980 | Kudo et al. |
| 4,262,063 A | 4/1981 | Kudo et al. |
| 4,316,944 A | 2/1982 | Landsman et al. |
| 4,373,014 A | 2/1983 | Landsman et al. |
| 4,390,603 A | 6/1983 | Kawana et al. |

(Continued)

FOREIGN PATENT DOCUMENTS

EP 0034248 A1 8/1981

(Continued)

OTHER PUBLICATIONS

Huffman, Brian, "Regulator Boosts Battery Voltage", Electronic Design, Jul. 26, 1990, p. 58, vol. 38, No. 14, Penton Publishing, Cleveland, OH.

(Continued)

*Primary Examiner*—Patrick Joseph Ryan
*Assistant Examiner*—Angela J. Martin
(74) *Attorney, Agent, or Firm*—Dorsey & Whitney LLP

(57) ABSTRACT

A fuel cell assembly including a membrane electrode assembly, an anode plate, a cathode plate, a removable fuel cartridge, and a fuel delivery system. The assembly includes an anode, a cathode, and a polymer electrolyte membrane having a fuel side and an oxygen side. The fuel cartridge includes an expandable fuel bladder for receiving liquid fuel, an expandable pressure member in contact with the bladder for maintaining a positive pressure on the bladder, and a sealable exit port in fluid communication with the bladder. The fuel delivery system delivers fuel from the cartridge to the fuel side of the membrane. An Interface, Control, and Regulator Circuit for Fuel Cell Powered Electronic Device.

22 Claims, 25 Drawing Sheets

U.S. PATENT DOCUMENTS

| | | | |
|---|---|---|---|
| 4,395,322 | A | 7/1983 | Harris |
| 4,407,904 | A | 10/1983 | Uozumi et al. |
| 4,407,905 | A | 10/1983 | Takeuchi et al. |
| 4,413,041 | A | 11/1983 | Hegedus |
| 4,417,969 | A | 11/1983 | Ezzell et al. |
| 4,420,544 | A | 12/1983 | Lawson et al. |
| 4,446,210 | A | 5/1984 | Okada et al. |
| 4,447,506 | A | 5/1984 | Luczak et al. |
| 4,456,521 | A | 6/1984 | Solomon et al. |
| 4,476,002 | A | 10/1984 | Howard et al. |
| 4,478,917 | A | 10/1984 | Fujita et al. |
| 4,481,266 | A | 11/1984 | Littauer et al. |
| 4,508,793 | A | 4/1985 | Kumata et al. |
| 4,524,113 | A | 6/1985 | Lesieur |
| 4,537,840 | A | 8/1985 | Tsukui et al. |
| 4,542,079 | A | 9/1985 | Takeuchi et al. |
| 4,562,123 | A | 12/1985 | Shimizu et al. |
| 4,576,877 | A | 3/1986 | Alfenaar |
| 4,612,261 | A | 9/1986 | Tsukui et al. |
| 4,614,692 | A | 9/1986 | Kajiyama et al. |
| 4,614,837 | A | 9/1986 | Kane et al. |
| 4,629,664 | A | 12/1986 | Tsukui et al. |
| 4,640,873 | A | 2/1987 | Tajima et al. |
| 4,642,274 | A | 2/1987 | Tsutsumi et al. |
| 4,643,806 | A | 2/1987 | Hegedus et al. |
| 4,647,359 | A | 3/1987 | Lindstrom |
| 4,670,359 | A | 6/1987 | Beshty et al. |
| 4,670,702 | A | 6/1987 | Yamada et al. |
| 4,673,624 | A | 6/1987 | Hockaday |
| 4,680,240 | A | 7/1987 | Furukawa et al. |
| 4,686,157 | A | 8/1987 | Miyake et al. |
| 4,702,973 | A | 10/1987 | Marianowski |
| 4,716,087 | A | 12/1987 | Ito et al. |
| 4,755,272 | A | 7/1988 | Plowman |
| 4,761,209 | A | 8/1988 | Bonaventura et al. |
| 4,761,349 | A | 8/1988 | McPheeters et al. |
| 4,769,296 | A | 9/1988 | Sterzel |
| 4,774,152 | A | 9/1988 | Matsumura et al. |
| 4,774,153 | A | 9/1988 | Sterzel |
| 4,794,054 | A | 12/1988 | Ito et al. |
| 4,808,493 | A | 2/1989 | Breault |
| 4,820,594 | A | 4/1989 | Sugita et al. |
| 4,828,941 | A | 5/1989 | Sterzel |
| 4,855,193 | A | 8/1989 | McElroy |
| 4,865,906 | A | 9/1989 | Smith, Jr. |
| 4,865,925 | A | 9/1989 | Ludwig et al. |
| 4,876,115 | A | 10/1989 | Raistrick |
| 4,937,220 | A | 6/1990 | Nickols, Jr. |
| 4,970,128 | A | 11/1990 | Itoh et al. |
| 4,985,386 | A | 1/1991 | Tsurumi et al. |
| 4,988,582 | A | 1/1991 | Dyer |
| 5,004,424 | A | 4/1991 | Larminie |
| 5,019,463 | A | 5/1991 | Matsubara et al. |
| 5,024,905 | A | 6/1991 | Itoh et al. |
| 5,034,288 | A | 7/1991 | Bossel |
| 5,035,962 | A | 7/1991 | Jensen |
| 5,061,581 | A | 10/1991 | Narang et al. |
| 5,068,161 | A | 11/1991 | Keck et al. |
| 5,079,107 | A | 1/1992 | Jalan |
| 5,084,144 | A | 1/1992 | Reddy et al. |
| 5,094,928 | A | 3/1992 | Dyer |
| 5,102,750 | A | 4/1992 | Taylor |
| 5,102,751 | A | 4/1992 | Narang et al. |
| 5,132,193 | A | 7/1992 | Reddy et al. |
| 5,171,644 | A | 12/1992 | Tsou et al. |
| 5,178,971 | A | 1/1993 | Itoh et al. |
| 5,183,713 | A | 2/1993 | Kunz |
| 5,186,877 | A | 2/1993 | Watanabe |
| 5,189,005 | A | 2/1993 | Watanabe et al. |
| 5,208,207 | A | 5/1993 | Stonehart et al. |
| 5,225,391 | A | 7/1993 | Stonehart et al. |
| 5,229,222 | A | 7/1993 | Tsutsumi et al. |
| 5,234,772 | A | 8/1993 | Oguchi et al. |
| 5,234,777 | A | 8/1993 | Wilson |
| 5,238,754 | A | 8/1993 | Yasuo et al. |
| 5,252,410 | A | 10/1993 | Wilkinson et al. |
| 5,262,250 | A | 11/1993 | Watanabe |
| 5,271,917 | A | 12/1993 | Hoffman |
| 5,284,718 | A | 2/1994 | Chow et al. |
| 5,284,878 | A | 2/1994 | Studer et al. |
| 5,294,317 | A | 3/1994 | Saito et al. |
| 5,294,580 | A | 3/1994 | Dufner |
| 5,298,343 | A | 3/1994 | Savadogo et al. |
| 5,302,471 | A | 4/1994 | Ito et al. |
| 5,312,876 | A | 5/1994 | Dang et al. |
| 5,312,895 | A | 5/1994 | Dang et al. |
| 5,314,760 | A | 5/1994 | Tsou et al. |
| 5,314,762 | A | 5/1994 | Hamada et al. |
| 5,316,643 | A | 5/1994 | Ahn et al. |
| 5,330,860 | A | 7/1994 | Grot et al. |
| 5,334,463 | A | 8/1994 | Tajima et al. |
| 5,346,780 | A | 9/1994 | Suzuki |
| 5,366,820 | A | 11/1994 | Tsutsumi et al. |
| 5,367,051 | A | 11/1994 | Narang et al. |
| 5,378,508 | A | 1/1995 | Castro |
| 5,384,208 | A | 1/1995 | Brand et al. |
| 5,403,675 | A | 4/1995 | Ogata et al. |
| 5,432,023 | A | 7/1995 | Yamada et al. |
| 5,438,082 | A | 8/1995 | Helmer-Metzmann et al. |
| 5,468,574 | A | 11/1995 | Ehrenberg et al. |
| 5,472,799 | A | 12/1995 | Watanabe |
| 5,480,735 | A | 1/1996 | Landsman et al. |
| 5,488,087 | A | 1/1996 | Cabasso et al. |
| 5,489,563 | A | 2/1996 | Brand et al. |
| 5,501,915 | A | 3/1996 | Hards et al. |
| 5,503,944 | A | 4/1996 | Meyer et al. |
| 5,505,851 | A | 4/1996 | Wagener et al. |
| 5,523,177 | A | 6/1996 | Kosek et al. |
| 5,525,436 | A | 6/1996 | Savinell et al. |
| 5,525,568 | A | 6/1996 | Yamaguchi et al. |
| 5,540,981 | A | 7/1996 | Gallagher et al. |
| 5,541,015 | A | 7/1996 | Tajima et al. |
| 5,547,911 | A | 8/1996 | Grot |
| 5,548,055 | A | 8/1996 | Narang et al. |
| 5,561,202 | A | 10/1996 | Helmer-Metzmann et al. |
| 5,573,866 | A | 11/1996 | Van Dine et al. |
| 5,576,074 | A | 11/1996 | Weigel et al. |
| 5,599,638 | A | 2/1997 | Surampudi et al. |
| 5,616,431 | A | 4/1997 | Kusunoki et al. |
| 5,627,737 | A | 5/1997 | Maekawa et al. |
| 5,631,099 | A | 5/1997 | Hockday |
| 5,633,098 | A | 5/1997 | Narang et al. |
| 5,635,039 | A | 6/1997 | Cisar et al. |
| 5,641,586 | A | 6/1997 | Wilson |
| 5,643,690 | A | 7/1997 | Tateishi et al. |
| 5,670,266 | A | 9/1997 | Thomas et al. |
| 5,672,439 | A | 9/1997 | Wilkinson et al. |
| 5,683,829 | A | 11/1997 | Sarangapani |
| 5,700,595 | A | 12/1997 | Reiser |
| 5,702,836 | A | 12/1997 | Ma et al. |
| 5,702,838 | A | 12/1997 | Yasumoto et al. |
| 5,723,229 | A | 3/1998 | Scheifers et al. |
| 5,731,104 | A | 3/1998 | Ventura et al. |
| 5,741,408 | A | 4/1998 | Helmer-Metzmann et al. |
| 5,759,712 | A | 6/1998 | Hockaday |
| 5,773,162 | A | 6/1998 | Surampudi et al. |
| 5,773,480 | A | 6/1998 | Stone et al. |
| 5,789,093 | A | 8/1998 | Malhi |
| 5,795,496 | A | 8/1998 | Yen et al. |
| 5,798,187 | A | 8/1998 | Wilson et al. |
| 5,804,325 | A | 9/1998 | Yepez |
| 5,834,523 | A | 11/1998 | Steck et al. |
| 5,834,566 | A | 11/1998 | Helmer-Metzmann et al. |
| 5,846,615 | A | 12/1998 | Sharma et al. |

| | | | | |
|---|---|---|---|---|
| 5,856,036 | A | 1/1999 | Smotkin | |
| 5,858,568 | A | 1/1999 | Hsu et al. | |
| 5,863,673 | A | 1/1999 | Campbell et al. | |
| 5,874,182 | A | 2/1999 | Wilkinson et al. | |
| 5,876,867 | A | 3/1999 | Itoh et al. | |
| 5,885,338 | A | 3/1999 | Nigam et al. | |
| 5,886,890 | A | 3/1999 | Ishida et al. | |
| 5,894,038 | A | 4/1999 | Sharma et al. | |
| 5,904,740 | A | 5/1999 | Davis | |
| 5,906,716 | A | 5/1999 | Mertesdorf et al. | |
| 5,916,699 | A | 6/1999 | Thomas et al. | |
| 5,916,702 | A | 6/1999 | Marucchi-Soos et al. | |
| 5,922,487 | A | 7/1999 | Watanabe et al. | |
| 5,928,806 | A | 7/1999 | Olah et al. | |
| 5,945,231 | A | 8/1999 | Narayanan et al. | |
| 5,952,119 | A | 9/1999 | Wilson | |
| 5,954,928 | A | 9/1999 | Kishi et al. | |
| 5,958,616 | A | 9/1999 | Salinas et al. | |
| 5,961,814 | A * | 10/1999 | Kearns | 208/39 |
| 5,973,025 | A | 10/1999 | Nigam et al. | |
| 5,976,725 | A | 11/1999 | Gamo et al. | |
| 5,980,998 | A | 11/1999 | Sharma et al. | |
| 5,981,095 | A | 11/1999 | Leddy et al. | |
| 5,984,986 | A | 11/1999 | Wiesheu et al. | |
| 5,985,942 | A | 11/1999 | Steck et al. | |
| 5,992,008 | A | 11/1999 | Kindler | |
| 5,993,984 | A | 11/1999 | Matsumura et al. | |
| 5,998,599 | A | 12/1999 | Ruegg et al. | |
| 6,007,930 | A | 12/1999 | Adams et al. | |
| 6,007,934 | A | 12/1999 | Auer et al. | |
| 6,010,798 | A | 1/2000 | Hammerschmidt et al. | |
| 6,017,650 | A | 1/2000 | Ramunni et al. | |
| 6,040,077 | A | 3/2000 | Debe et al. | |
| 6,045,934 | A | 4/2000 | Enami | |
| 6,048,473 | A | 4/2000 | Denda et al. | |
| 6,057,051 | A | 5/2000 | Uchida et al. | |
| 6,057,054 | A | 5/2000 | Barton et al. | |
| 6,060,190 | A | 5/2000 | Campbell et al. | |
| 6,066,410 | A | 5/2000 | Auer et al. | |
| 6,068,941 | A | 5/2000 | Fuller et al. | |
| 6,071,635 | A | 6/2000 | Carlstrom, Jr. | |
| 6,074,773 | A | 6/2000 | Wilkinson et al. | |
| 6,080,501 | A | 6/2000 | Kelley et al. | |
| 6,080,503 | A | 6/2000 | Schmid et al. | |
| 6,090,193 | A | 7/2000 | Nigam et al. | |
| 6,093,502 | A | 7/2000 | Carlstrom, Jr. et al. | |
| 6,100,600 | A | 8/2000 | Pflanz | |
| 6,106,965 | A | 8/2000 | Hirano et al. | |
| 6,110,613 | A | 8/2000 | Fuller | |
| 6,110,616 | A | 8/2000 | Sheikh-Ali et al. | |
| 6,117,222 | A | 9/2000 | Nigam et al. | |
| 6,117,579 | A | 9/2000 | Gyoten et al. | |
| 6,127,055 | A | 10/2000 | Simmons, Jr. | |
| 6,137,280 | A | 10/2000 | Ackermann et al. | |
| 6,171,444 | B1 | 1/2001 | Nigam | |
| 6,241,787 | B1 | 6/2001 | Nigam | |
| 6,300,381 | B1 | 10/2001 | Kerres et al. | |
| 6,309,772 | B1 | 10/2001 | Zuber et al. | |
| 6,326,097 | B1 | 12/2001 | Hockaday | |
| 6,326,099 | B1 | 12/2001 | Schubert | |
| 6,460,733 | B1 * | 10/2002 | Acker et al. | 222/94 |
| 2002/0045085 | A1 | 4/2002 | Formato et al. | |
| 2002/0091225 | A1 | 7/2002 | McGarth et al. | |
| 2003/0129464 | A1 * | 7/2003 | Becerra et al. | 429/25 |

FOREIGN PATENT DOCUMENTS

| | | | |
|---|---|---|---|
| EP | 0068508 | B1 | 9/1986 |
| EP | 0310860 | A1 | 4/1989 |
| EP | 0337626 | A1 | 10/1989 |
| EP | 0574791 | B1 | 12/1999 |
| EP | 1 087 455 | A2 | 3/2001 |
| FR | 2793450 | | 11/2000 |
| GB | 1534015 | | 11/1978 |
| WO | WO 95/27759 | A1 | 10/1995 |
| WO | WO 98/22989 | A1 | 5/1998 |
| WO | WO 99/54389 | A1 | 10/1999 |
| WO | WO 99/54407 | A2 | 10/1999 |
| WO | WO 00/09610 | A1 | 2/2000 |
| WO | WO 00/10736 | A1 | 3/2000 |
| WO | WO 00/22684 | A3 | 4/2000 |
| WO | WO 00/24796 | A1 | 5/2000 |
| WO | WO 00/27513 | A2 | 5/2000 |
| WO | WO 00/35032 | A1 | 6/2000 |
| WO | WO 00/52779 | A1 | 9/2000 |

OTHER PUBLICATIONS

Landgrebe, A.R., et al., "Direct Methanol-Air Fuel Cell: An Overview of the Workshop," Proc. Workshop Direct Methanol-Air Fuel Cells, A.R. Landgrebe, et al. (eds.), The Electrochemical Society, Inc.: Pennington, NJ 92(14):1-223 (1992).

Gasteiger, H.A. et al., "$CH_3OH$ Oxidation on Well-Characterized Pt-Ru Alloys," Chemical Engineering Department, University of California at Berkeley and Lawrence Berkeley Laboratory, Berkeley, CA, pp. 1-5, Mar. 15, 1993.

Gasteiger, H.A., Methanol Electro-Oxidation on Well-Characterized Pt-Ru Alloys—Temperature Effects—, The Electrochemical Society Interface, pp. 49-50, Fall 1994.

Kerres, J. et al., "Synthesis and Characterization of Novel Acid-Base Polymer Blends for Application in Membrane Fuel Cells," Solid State Ionics 125, pp. 243-249, 1999.

Miyatake, K. et al., "Synthesis of Poly (phenylene sulfide sulfonic acid) via Poly (sulfonium cation) as a Thermostable Proton-Conducting Polymer," Macromolecules, 29, pp. 6969-6971, 1996.

Miyatake et al., "Synthesis and Proton Conductivity of Highly Sulfonated Poly (thiophenylene)," Macromolecules, 30, pp. 2941-2946, 1997.

Parsons, R. et al., "The Oxidation of Small Organic Molecules A Survey of Recent Fuel Cell Related Research," Department of Chemistry, The University, Southampton S09 5NH (Great Britain), pp. 9-45, Jul. 22, 1998.

Rulkens et al., "Rigid-Rod Polyelectrolytes Based on Poly (p-Phenylene Sulfonic Acid)," Ber. Bunsenges. Phys. Chem., 100 (No. 6), pp. 707-714, 1996.

Wang et al., "A $H_2/O_2$ Fuel Cell Using Acid Doped Polybenzimidazole as Polymer Electrolyte," Electrochemical Society Proceedings, vol. 95-23, pp. 202-213, 1996.

Wheeler, D.J. et al., "Requirements for the Direct Methanol/Air Fuel Cell," Proceedings of the Workshop on Direct Methanol/Air Fuel Cells, vol. 92-14, The Electrochemical Society, pp. 193-205, 1992.

* cited by examiner

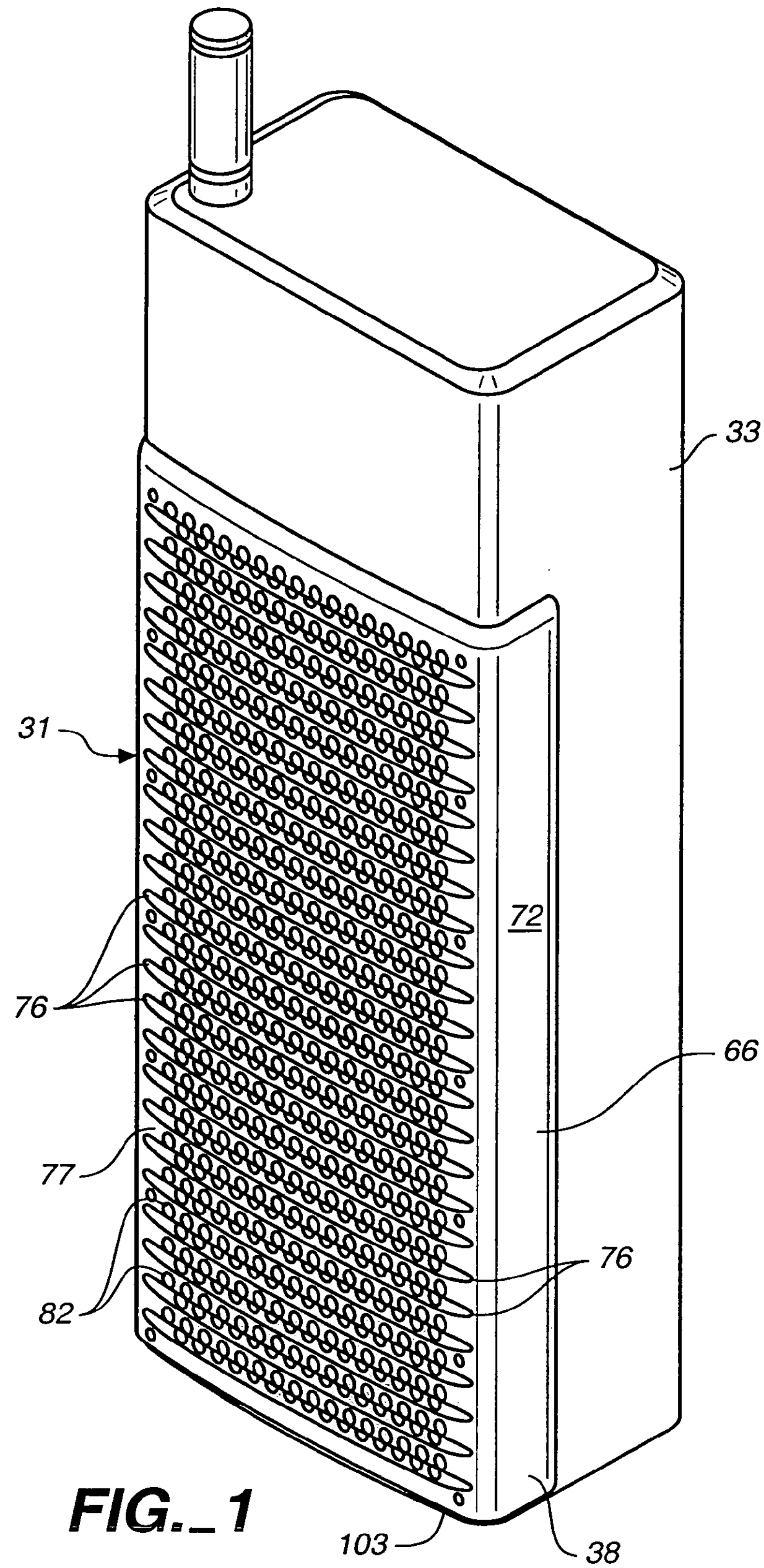
FIG._1

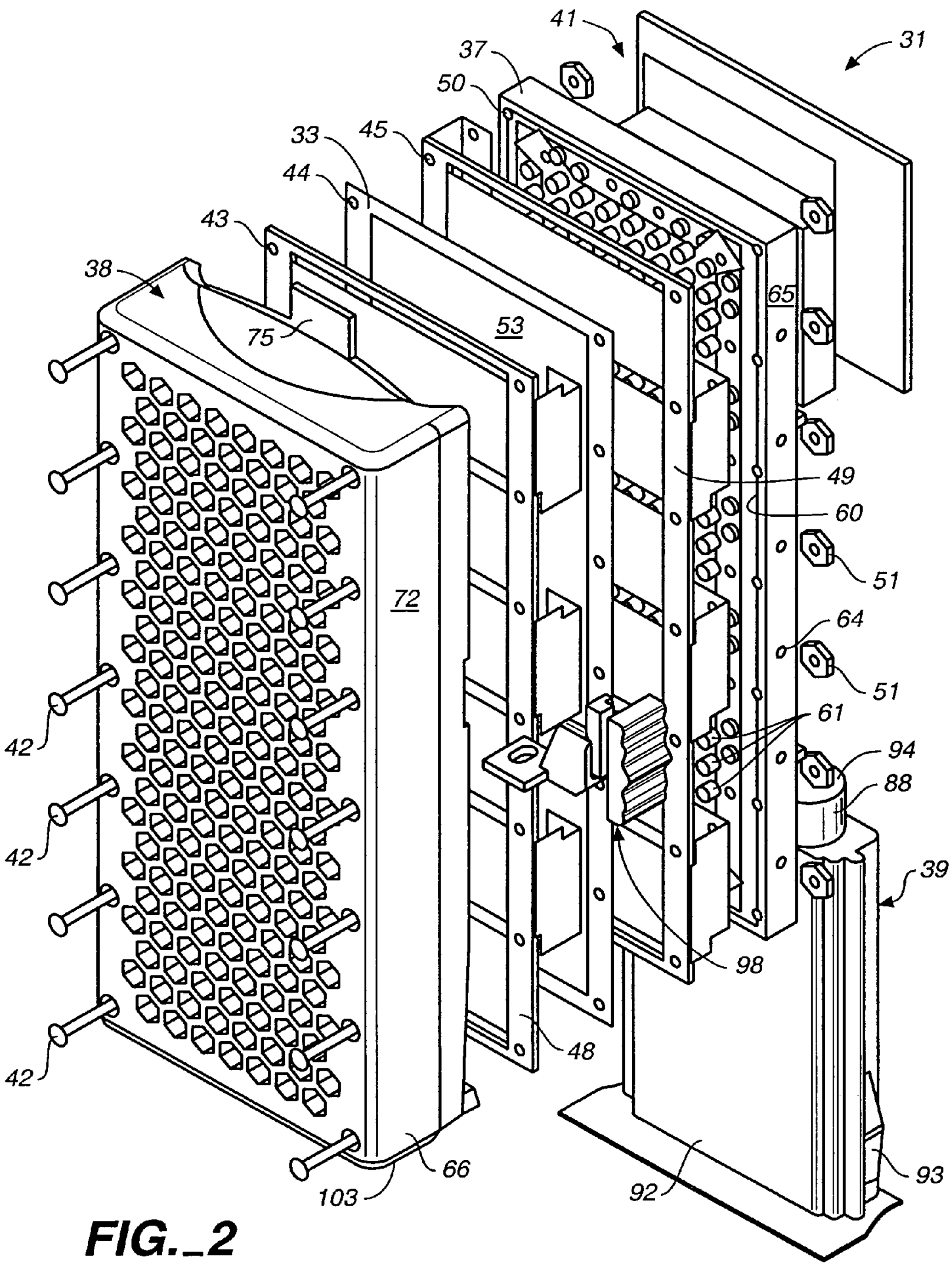
FIG._2

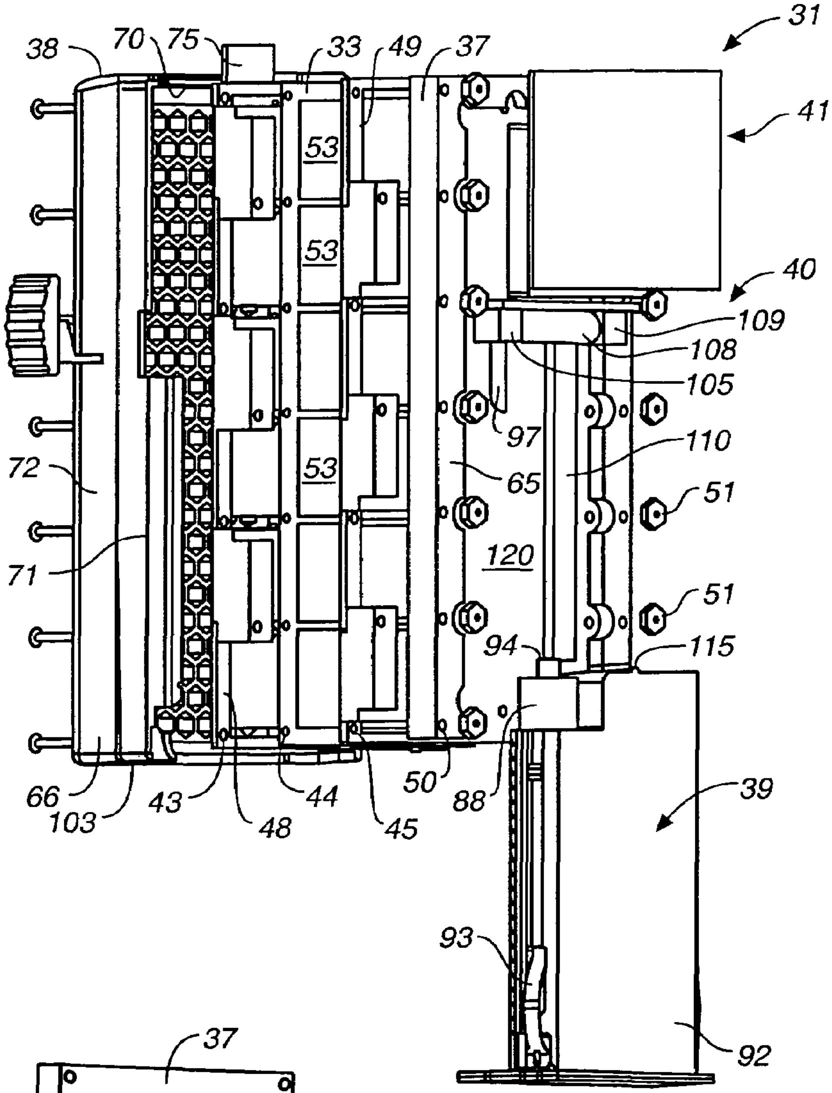
FIG._3
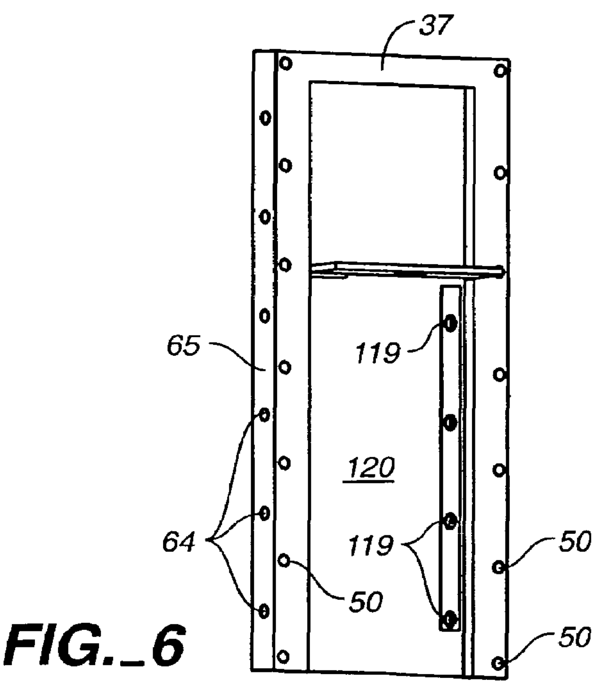
FIG._6

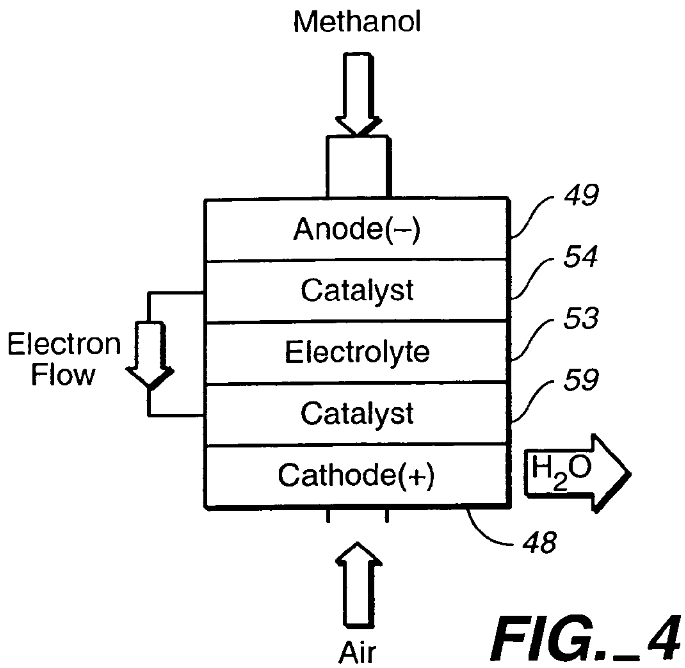
FIG._4
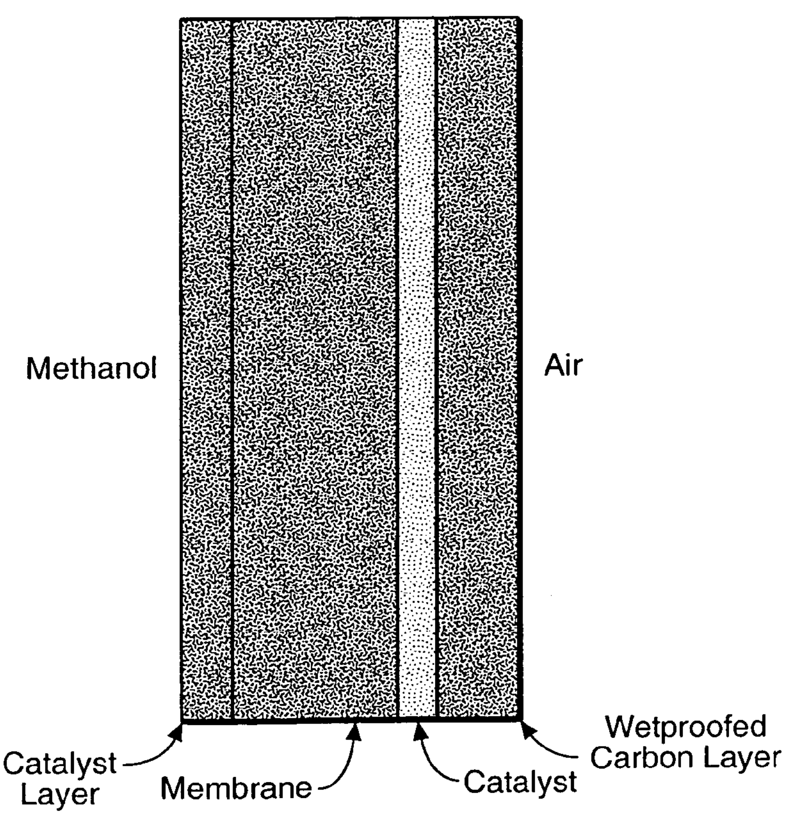
FIG._5

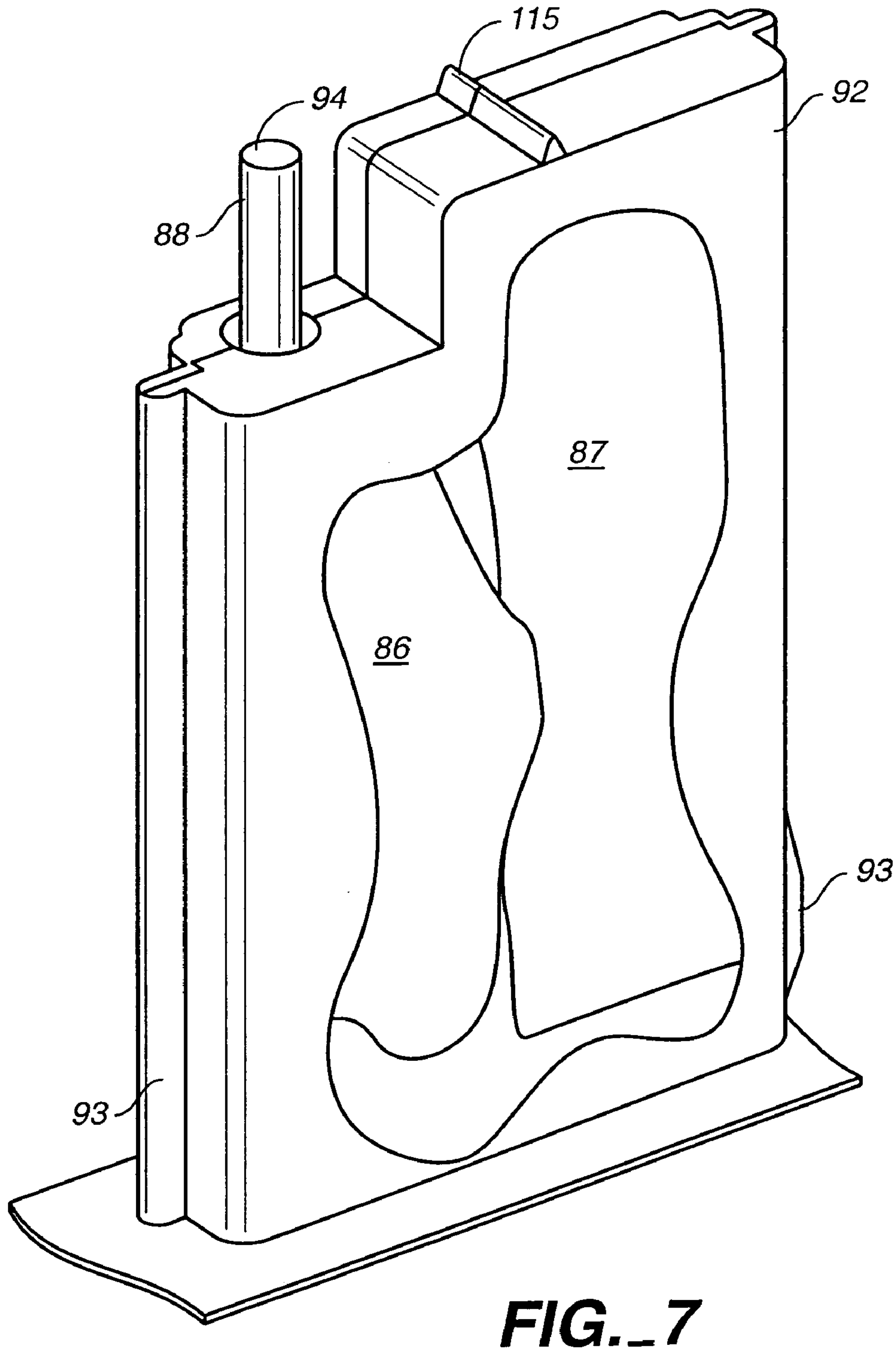
FIG._7

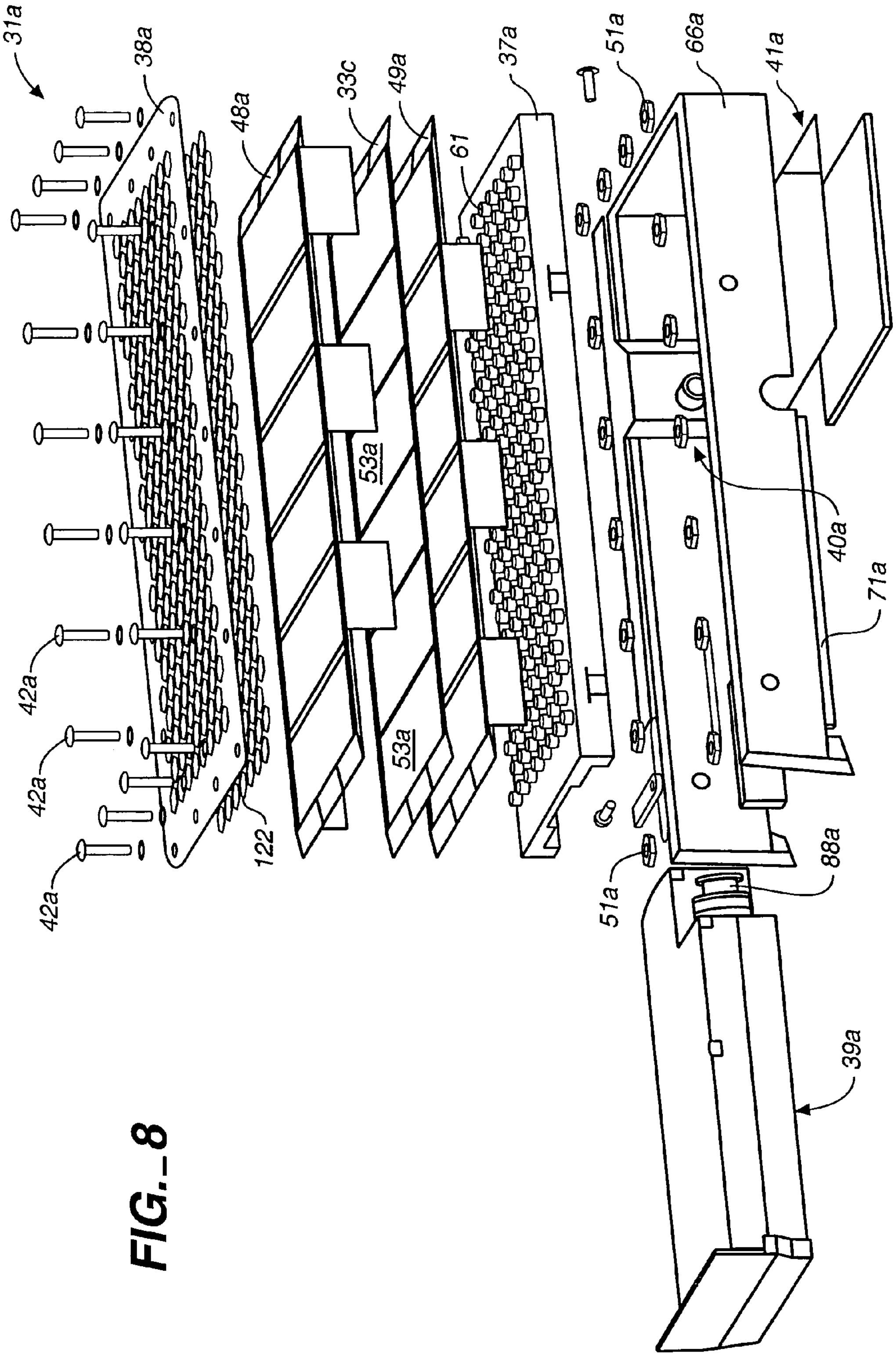
FIG._8

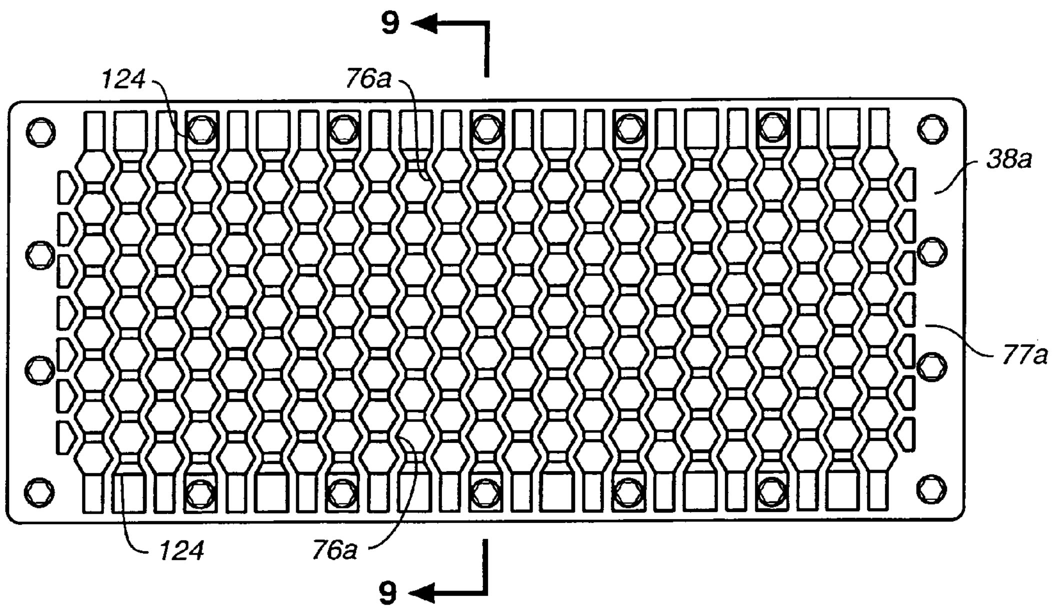
FIG._9a
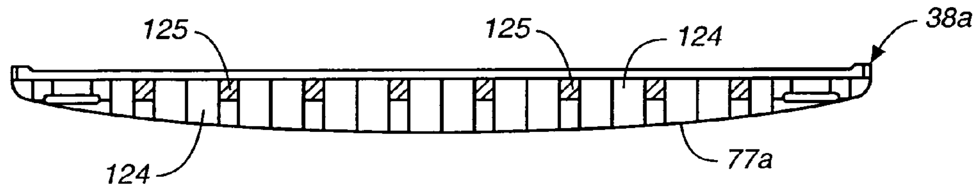
FIG._9b

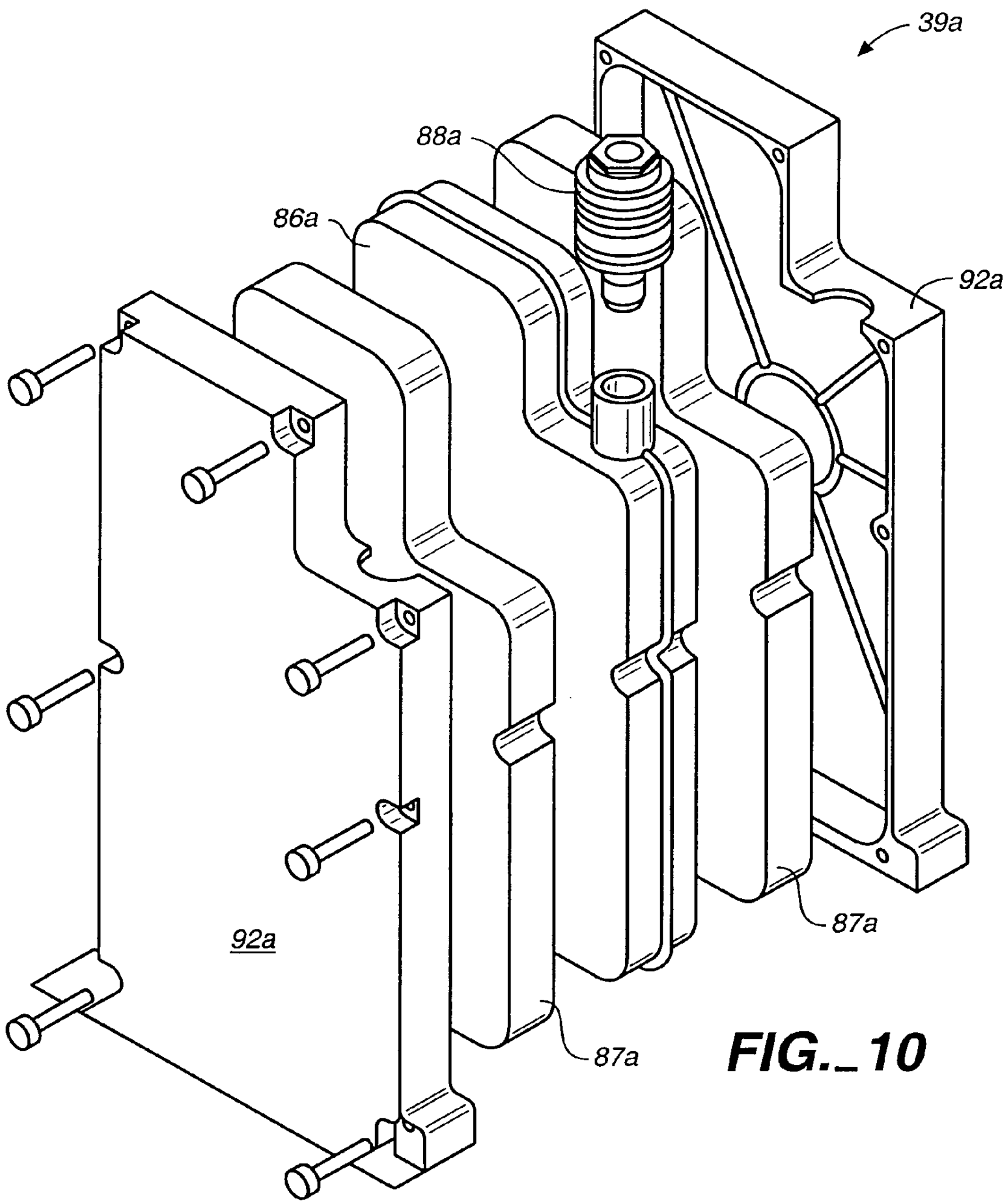
FIG._10

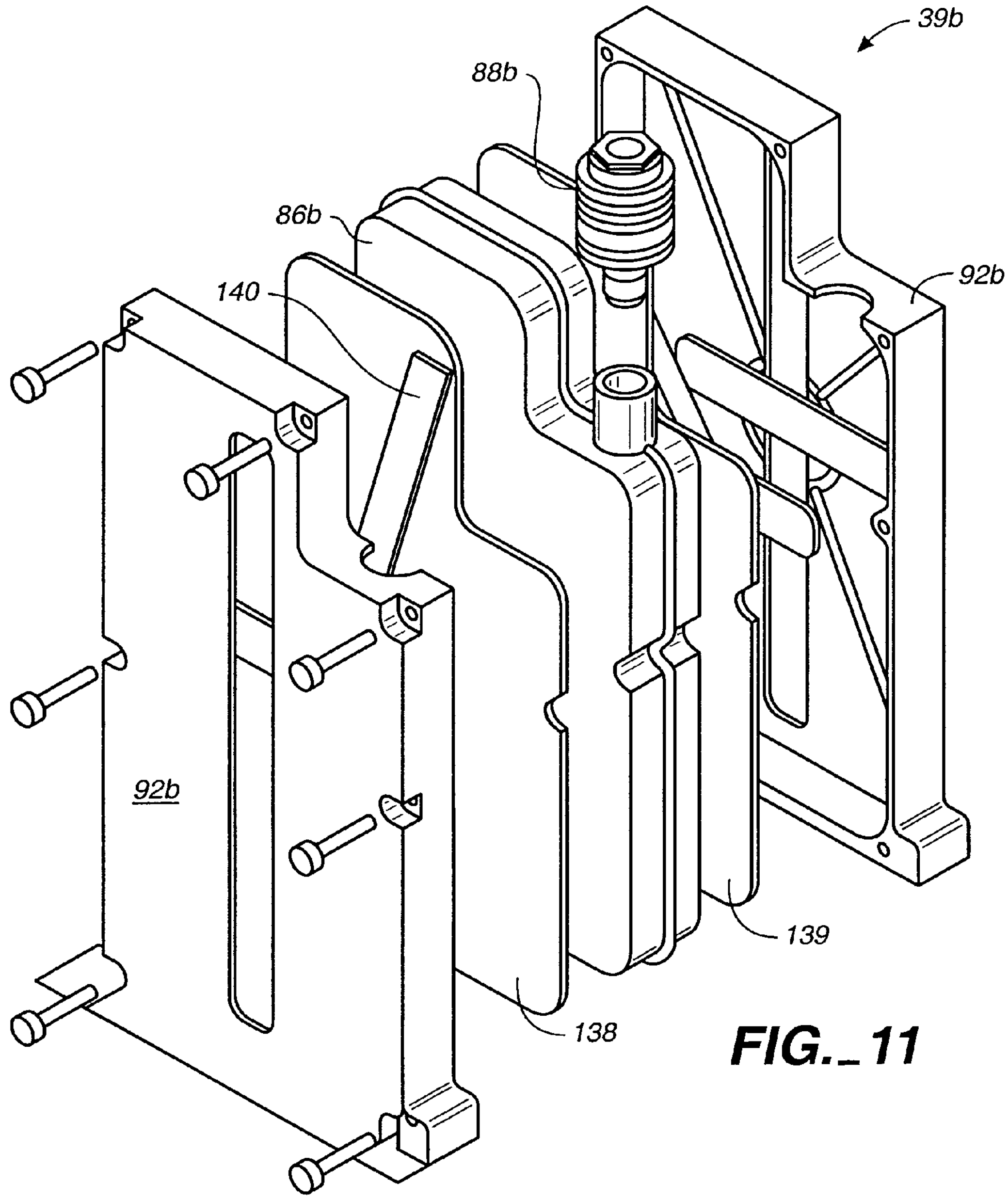
FIG._11

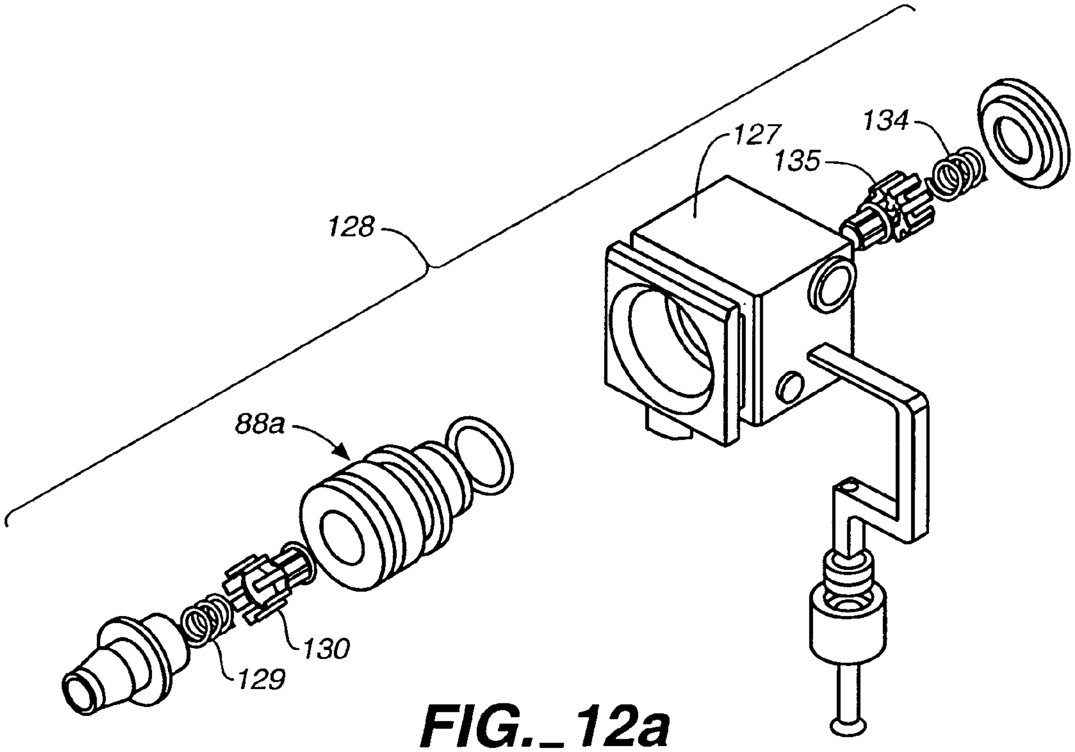
FIG._12a
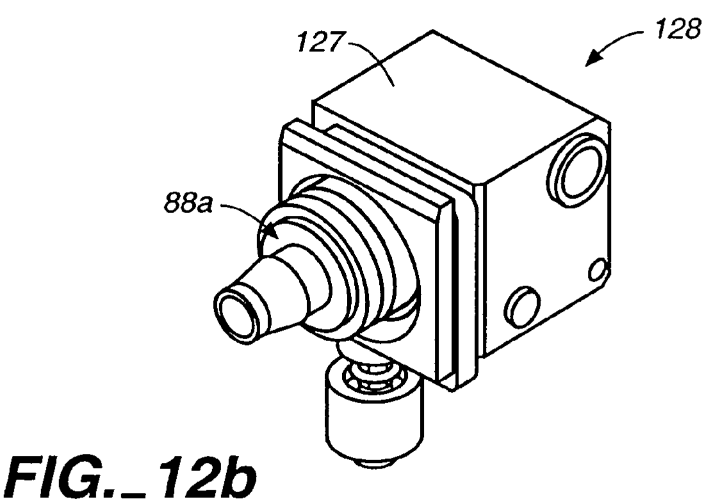
FIG._12b

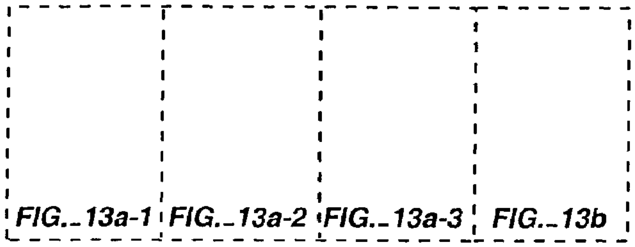
FIG._13a
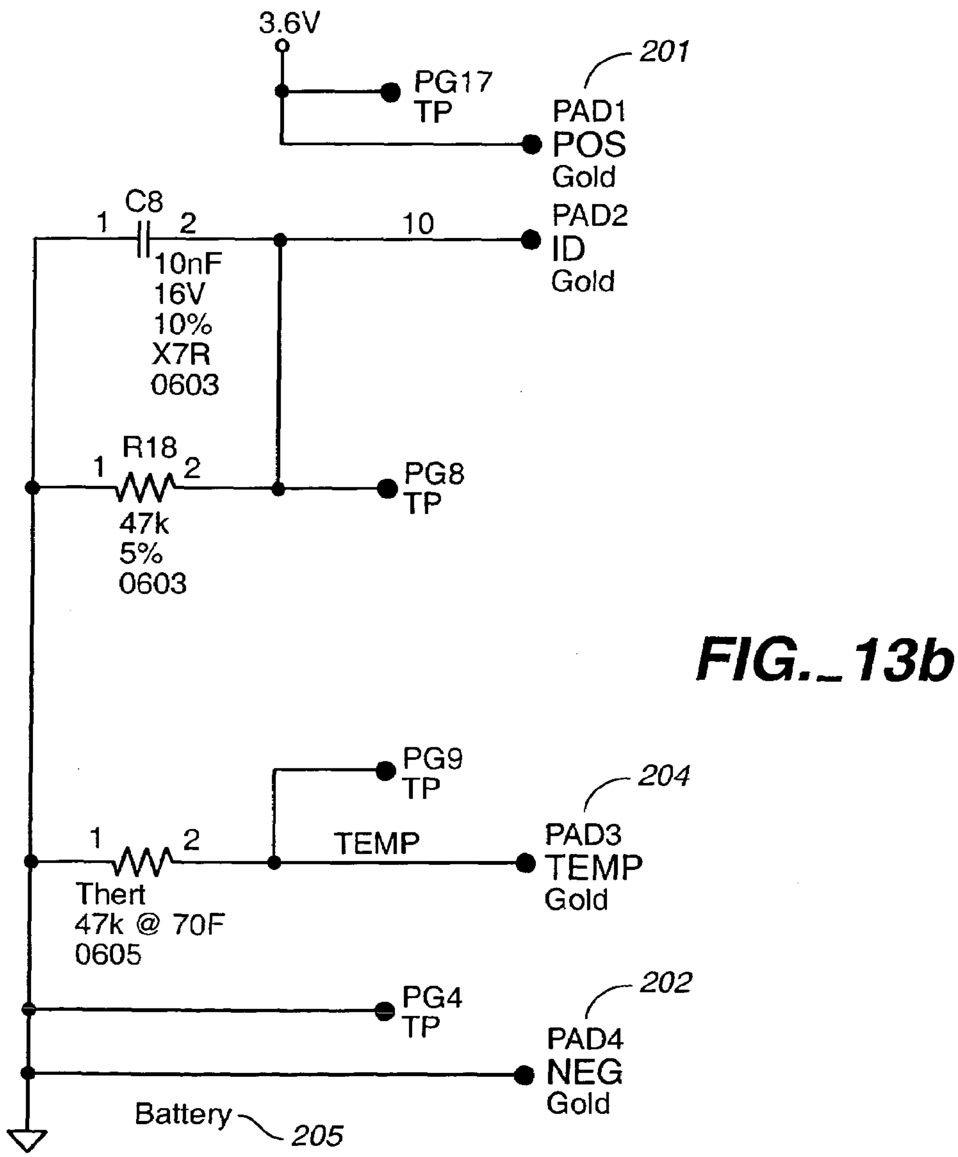
FIG._13b

FIG._13a-1
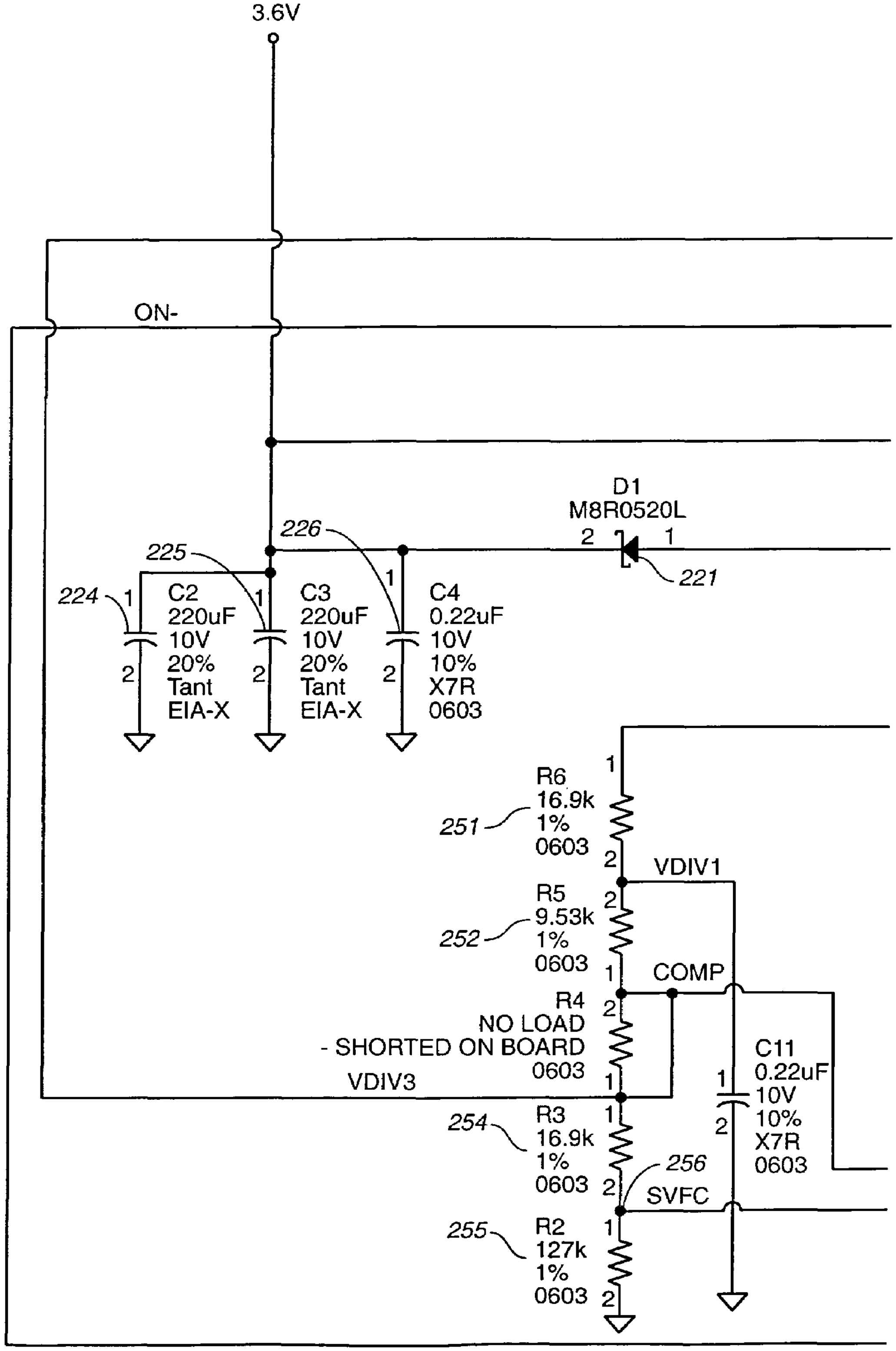

FIG._13a-2
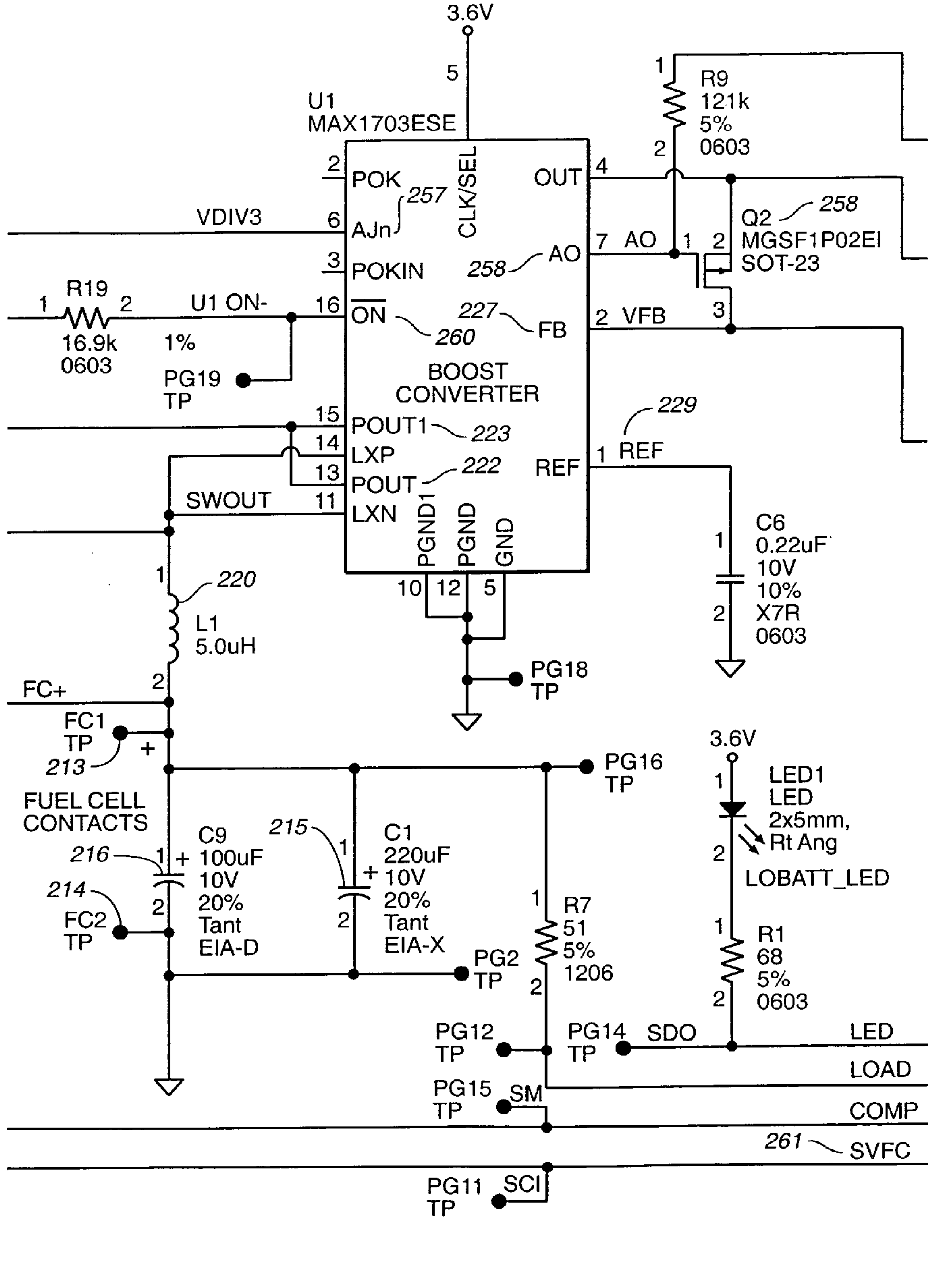

FIG._13a-3
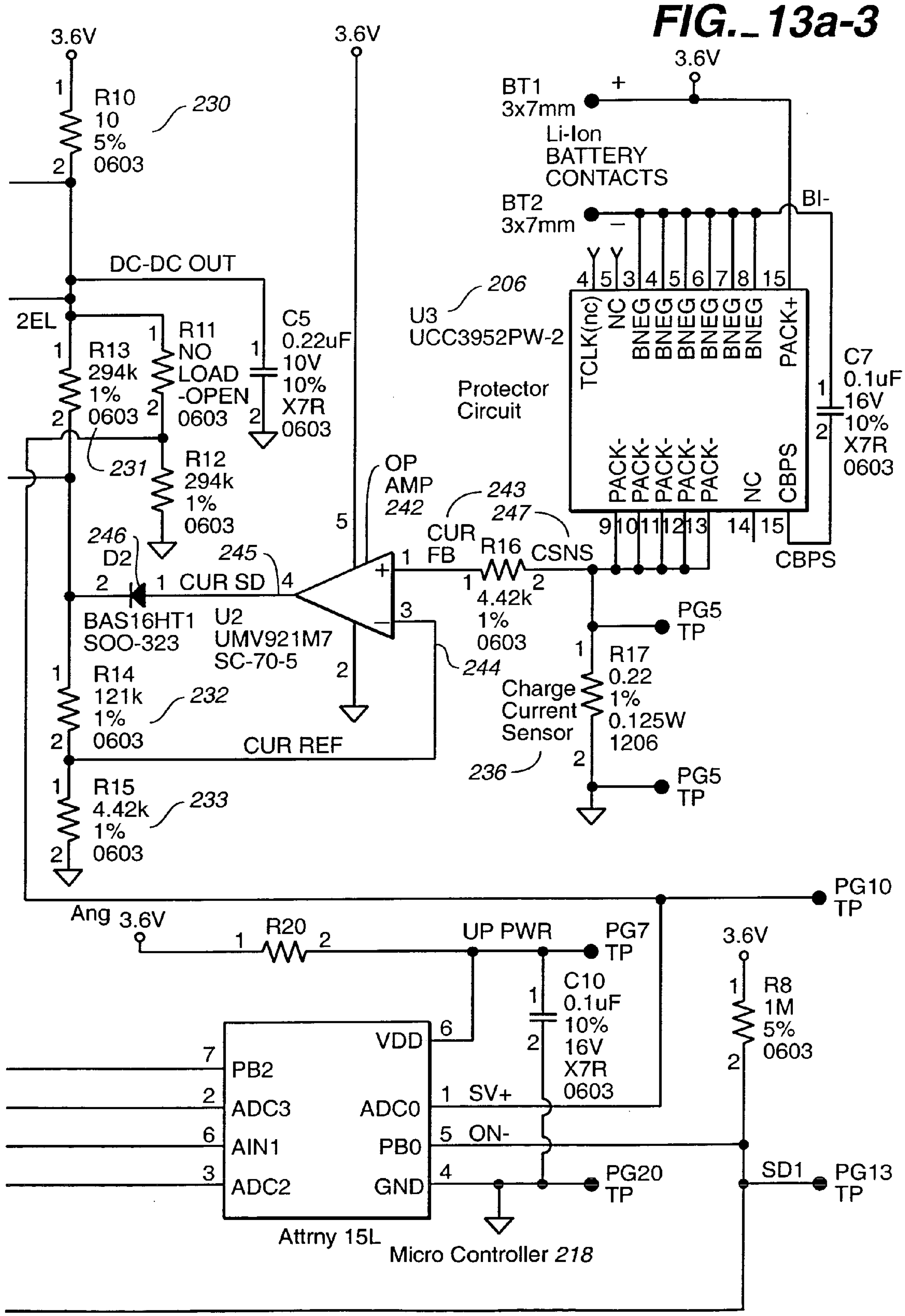

Software VFC Levels
Level 1 - 2.4V If OFF Load Test Above, with Warning
Level 2 - 1.5V If ON Sleep Above
Level 3 - 1.2V If ON Warning Below
Level 4 - 1.1V If ON Stop Below
Hardware Trip from Sleep is Between L2-L3
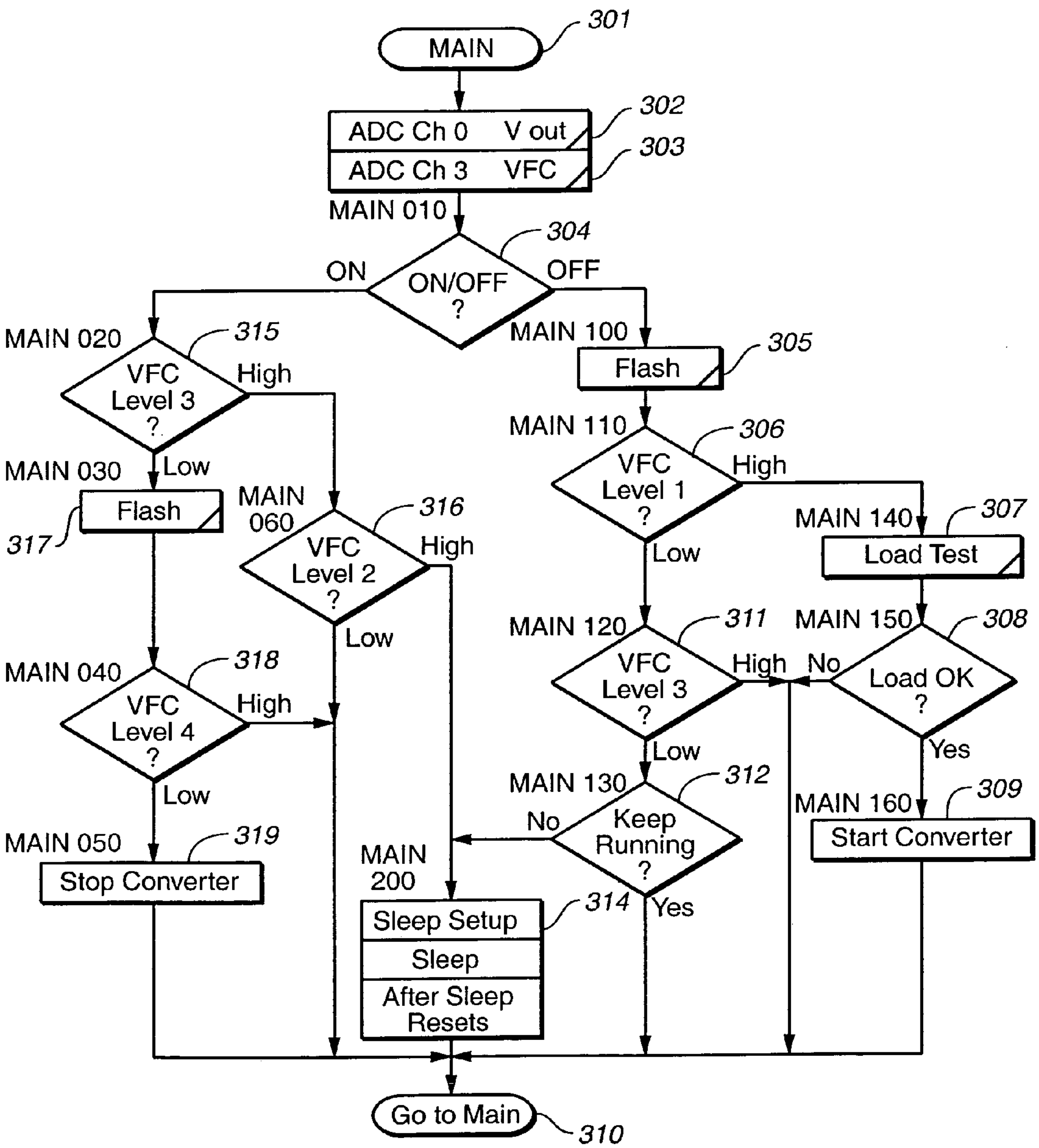
FIG._14

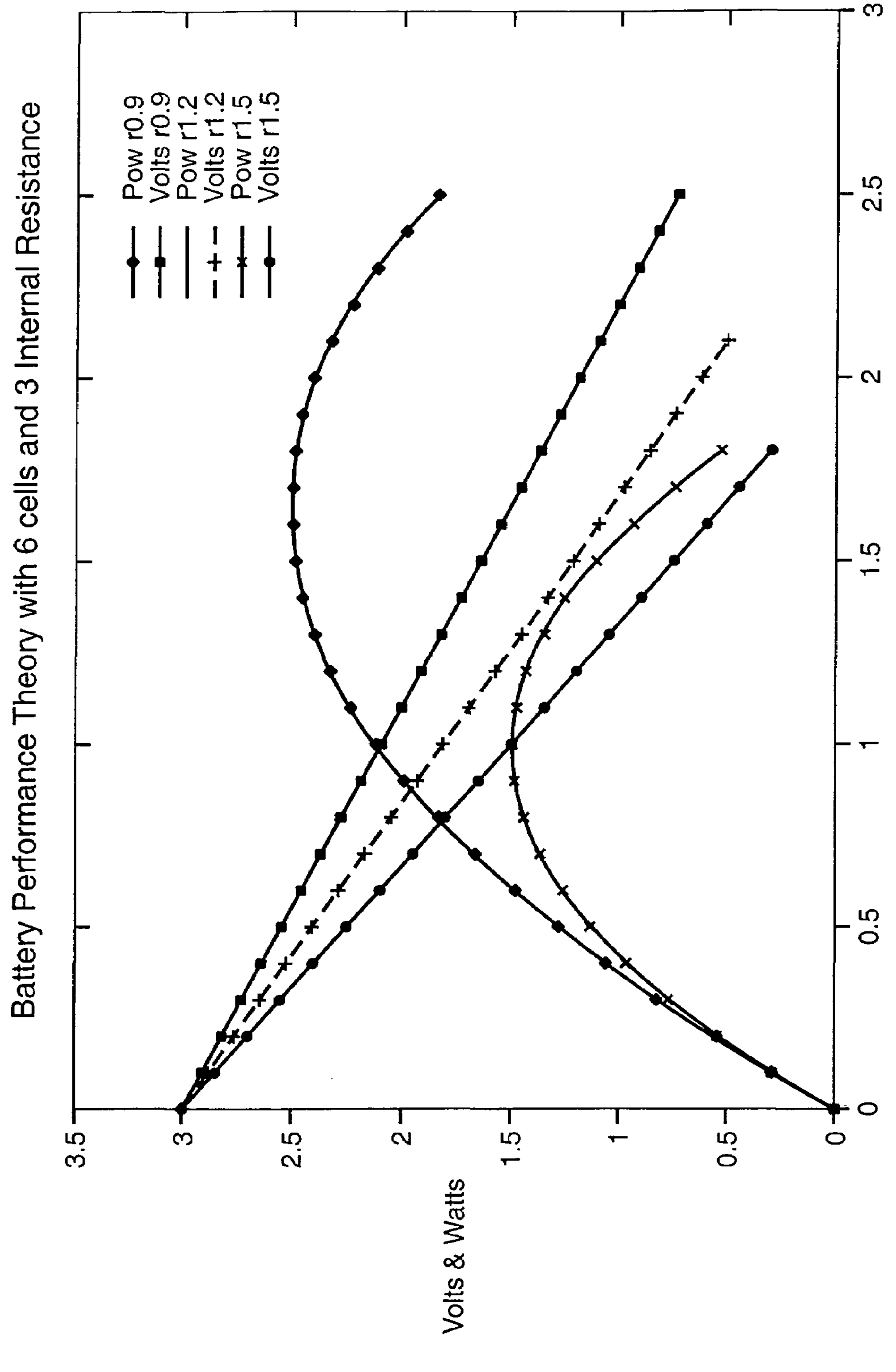
FIG._15

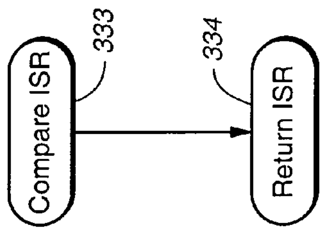
FIG._19
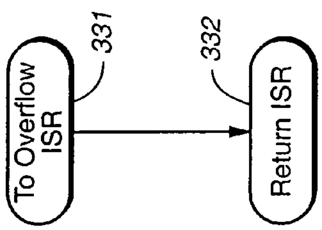
FIG._18
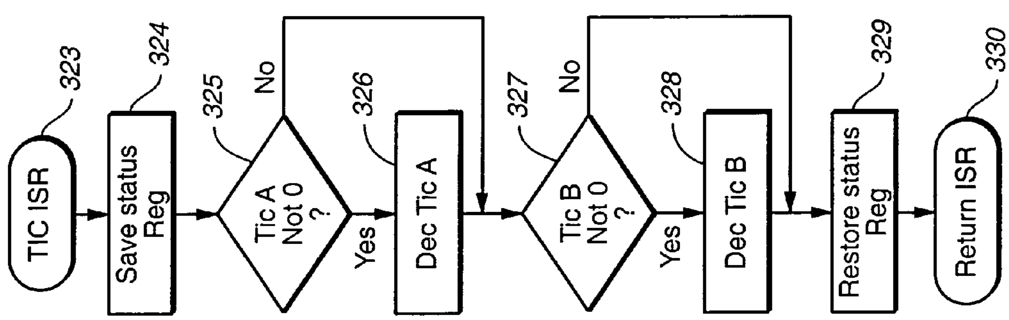
FIG._17
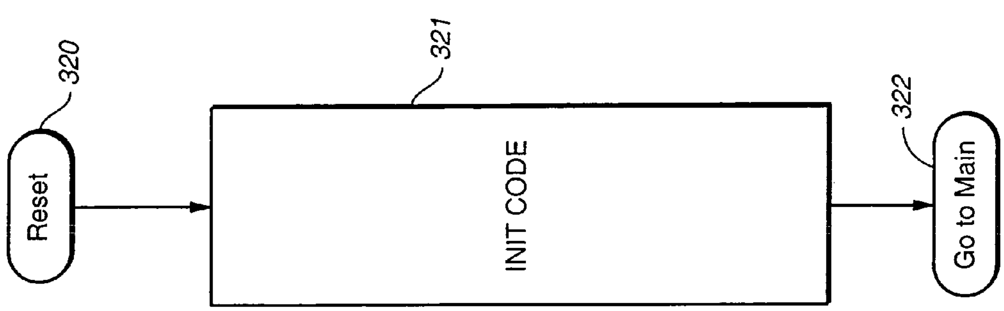
FIG._16

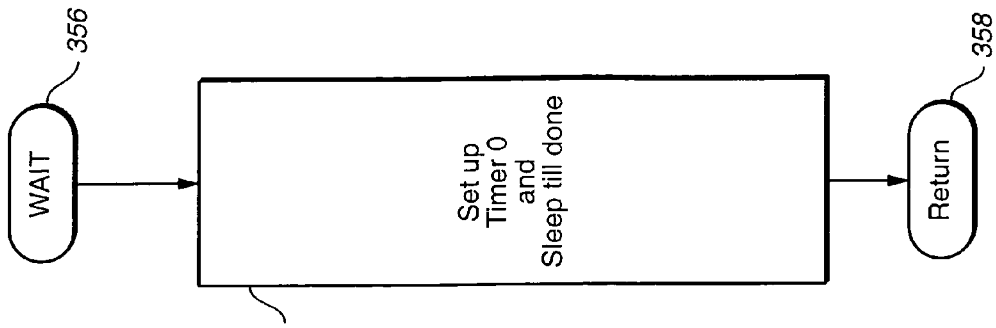
FIG._23
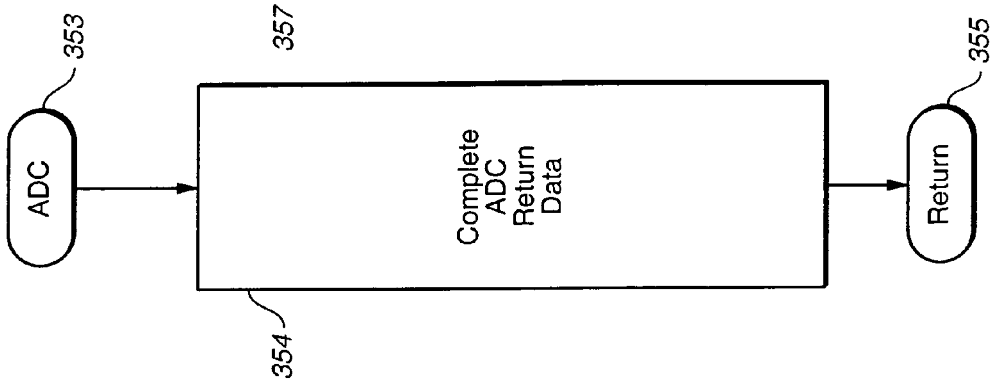
FIG._22
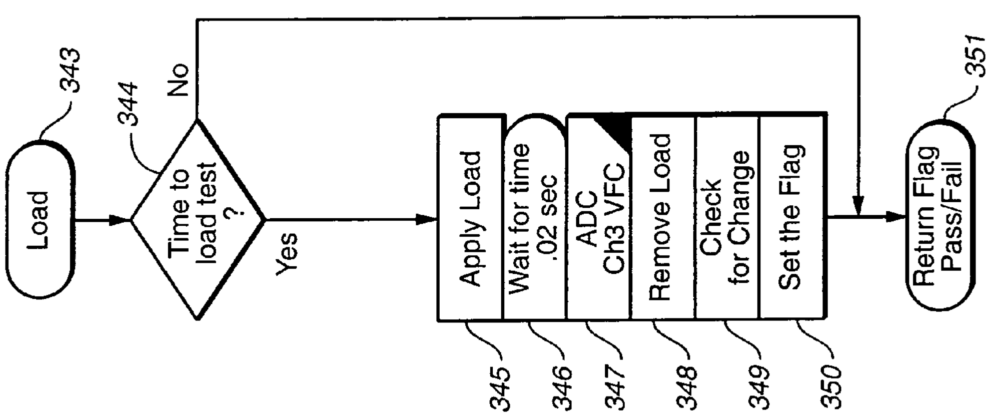
FIG._21
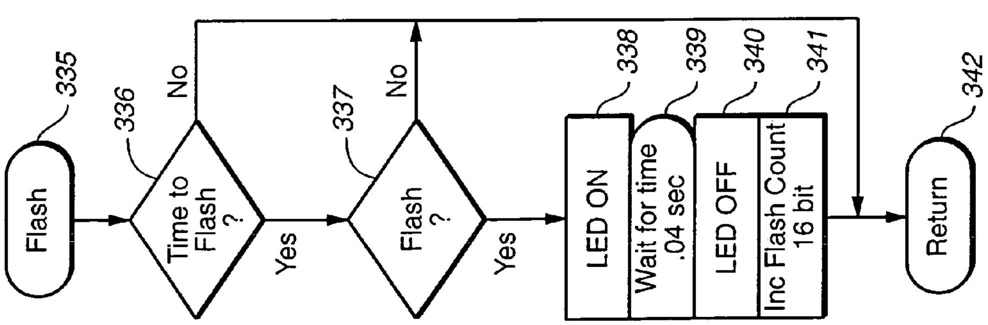
FIG._20

```
; Code file for                 Stepup boost convertr
;
;
;
;
;

.include "tnlSde5.inc: ; supplies all std port and pin refances for tiny15
.include "constdef.inc" ; supplies init values

; regesters Defenations

.DEF    LOADOK      = r14   ; flag for load ok = 1
.DEF    TEMPF       = r15   ; Temp for flages
.DEF    VCCLOW      = r16   ; Voltage VCC
.DEF    VCCHIGH     = r17   ;
.DEF    VFCLALOW    = r18   ; Voltage FC under load
.DEF    VFCLAHIGH   = r19   ;
.DEF    VFCBALOW    = r20   ; Voltage FC main
.DEF    VFCBAHIGH   = r21   ;
.DEF    VFCDIFLOW   = r23   ; Load difrance
.DEF    VFCDIFHIGH  = r24   ;
.DEF    FLASHLOW    = r25   ; Flash Count for total stop
.DEF    FLASHHIGH   = r26   ;
.DEF    TICB        = r27   ; tic count A
.DEF    TICA        = r28   ; tic count B
.DEF    TEMP        = r29   ; For I/O transfer

; Port B Pins definatiions
.EQU    ONNOT       = 0     ; Digital out port
.EQU    LED         = 2     ; Digital out port
.EQU    LOAD        = 4     ; Digital out port
.EQU    SVCC        = 0     ; ADC Channel
.EQU    SVFC        = 2     ; ADC Channel
.EQU    Comp        = 1     ; Port (Compartor)

.EQU    VCCLOWN     = 16    ; Reg pointer assignments
.EQU    VFCLAN      = 18    ; Reg pointer assignments
.EQU    VFCBAN      = 20    ; Reg pointer assignments

.EQU    FLASHDEL    = 50    ; 5 sec flash start delay
.EQU    TICFLASH    = 10    ; ticks per cycle
.EQU    LOADDEL     = 150   ; 15 sec to first load test
.EQU    TICLOAD     = 100   ; ticks per load test

.EQU    STOPED      = 1     ; flasher stioed

.CSEG

; TSR Vectors
        rjmp    RESET       ; Reset Handler
        reti    ;           External Intrupt, Not used
        reti    ;           Pin Change Handler, Not used
        rjmp    TIM1_CMP    ; Timer 1 compare match, used for 0.1
sec tic
        reti;TIM1 OVF ;     Timer 1 overflow handler, Not used
        reti;TIM0_OVF ;     Timer 0 overflow handler, used for
short sub tic time
        reti;EE_RDY ;  EEPROM Ready handler
        reti;ANA_COMP ;     Analog Comparator Handler for Level
1.5 Fuel cell volts
```

FIG._24a

```
                reti        ;ADC              ; ADC Conversion handler
MAIN:           ; Main Program start

                ; read adc Ch for SVcc base
                ldi         ZH,SVCC           ; set chanel
                ldi         ZL,VCCLOWN        ; data store pointer
                rcall       ADCRUN            ; call ACD Converter

                ; read adc ch for SVFC
                ldi         ZH,SVFC           ; set chanel
                ldi         ZL,VFCBAN         ; data store pointer
                rcall       ADCRUN            ; call ACD Converter
                ;ldi        VFCBAHIGH,$O3         ; • • • test for VFC
                ;ldi        VFCBALOW,$5e
                ;ldi        VFCLAHIGH,$02     ; • • • test for VFC
                ;ldi        VFCLALOW,$ff
                ;cbi        ddrB,onnot
MAIN010:        ; test OFF/ON
                sbic        PINB,ONNOT        ; read ON pin
                rjmp        MAIN100

MAIN020:        ; test vfc for level 3
                cpi         VFCBALOW,low(LEVEL3)
                ldi         TEMP,high(LEVEL3)
                cpc         VFCBAHIGH,TEMP
                brsh        MAIN060           ; the value is equ or high
MAIN030:        rcall       FLASH             ; do flash
MAIN040:        ; test vfc for level 4
                cpi         VFCBALOW,low(LEVEL4)
                ldi         TEMP,high(LEVEL4)
                cpc         VFCBAHIGH,TEMP
                brsh        MAIN              ; the value is equ or high, loop to
main            ; rjmp      MAIN050           ; the value is low fall or jump
MAIN050:        ; Stop the converter
                sbi         PORTB,ONNOT       ; Stop Converter and test led
                rjmp        MAIN              ; loop to main
MAIN060:        ; test vfc for level 2
                cpi         VFCBALOW,low(LEVEL2)
                ldi         TEMP,high(LEVEL2)
                cpc         VFCBAHIGH,TEMP
                brsh        MAIN200           ; the value is equ or high
                rjmp        MAIN              ; the value is low fall or jump

                ; do flashe
MAIN100:        rcall       FLASH             ; do flash
MAIN110:        ; test vfc for level 1
                cpi         VFCBALOW,low(LEVEL1)
                ldi         TEMP,high(LEVEL1)
                cpc         VFCBAHIGH,TEMP
                brsh        MAIN140           ; the value is equ or high
                ; rjmp      MAIN120           ; the value is low fall or jump
MAIN120:        ; test vfc for level 3
                cpi         VFCBALOW,low(LEVEL3)
                ldi         TEMP,high(LEVEL3)
                cpc         VFCBAHIGH,TEMP
```

FIG._24b

```
                brsh        MAIN                ; the value is equ or high
                ; rjmp      MAIN130             ; the value is low fall or jump

MAIN130:        ; test Flasher for stoped
                cpi         FLASHHIGH, STOPED
                breq        MAIN200             ; we need to sleep
                rjmp        MAIN                ; keep looping

MAIN140:        ; do load test
                rcall       LOADTEST            ; test the load

MAIN150:        ; Test for load OK
                tst         LOADOK
                breq        MAIN                ; go to main

MAIN160:        ; start the converter
                cbi         PORTB, ONNOT        ; Start Converter
                clr         FLASHLOW            ; Stop Flashing
                clr         FLASHHIGH
                rjmp        MAIN                ; keep looping

MAIN200:        ; enter sleep mode
                cbi         ADCSR, ADEN         ; Power down the ADC
                clr         TICA
                clr         TICB
                ldi         TEMP, 0             ; stop timer int
                out         TIMSK, TEMP

                ldi         TEMP, MCUCRSET      ; set for idel
                out         MCUCR, TEMP
                ; may have to stop timers adc intrrupts
                ;sbi        ddrb, led           ;*******
                sleep       ; wate COMPARE
                ;cbi        ddrb, led           ; *****

MAIN210:        ; nop
                ; nop
                ; rjmp      MAIN210             ; we will wate hear for a low level 2

transet
                ldi         TEMP, TIMSKSET      ; Enable timer int
                out         TIMSK, TEMP

                sbi         ADCSR, ADEN         ; Power up the ADC
                rjmp        MAIN                ; back to looping


  Place init code hear
RESET:          ; Clear Requesters
                clr         r0                  ; Clear a master
                ldi         z1,29               ; Point to req r29
                st          z,r0                ; Clear
RESET01:    dec z1          ; set for next
                brne        RESET01             ; loop

                ; Setup the ADC
                ldi         TEMP, ADCSRSET
                out         ADCSR, TEMP
                sbi         ADCSR, ADEN  ; Power up the ADC

                ; Setup the comparitor
                ldi         TEMP, ACSRSET
                out         ACSR, TEMP

                ; Setup timer 0 for div 64
                ldi         TEMP, TCCR0SET
```

FIG._24c

```
                out         TCCR0, TEMP

                ; Setup Timer 1 for 1.ms int
                ldi         TRMP, TCCR1SET
                out         TCCR1, TEMP
                ldi         TEMP, OCR1ASET
                out         OCR1A, TEMP

                ; Setup Port B
                ldi         TEMP, DDRBSET        ; Data direction
                out         DDRB, TEMP
                ldi         TEMP, PORTBSET
                out         PORTB, TEMP

                ; ldi       ticb, 100

                ; Enable Interrupts
                ldi         TEMP, TIMSKSET       ; Enable timer int
                out         TIMSK, TEMP
                ldi         TEMP, GIMSKSET       ; Set the mask
                out         GIMSK, TEMP
                ldi         TEMP, SREGSET        ; Enable
                out         SREG, TEMP

                ; Setup sleep
                ldi         TEMP, MCUCRSET
                out         MCUCR, TEMP

                ; setup start delays
                ldi         TICA, FLASHDEL       ; flash start delay
                ldi         TICB, LOADDEL        ; load start delay

RESETEND:       rjmp        MAIN


; This ISR will dec the Time regesters tica and ticb to 0
TIM1_CMP:
                in          TEMPF, SREG          ; save status
                tst         tica
                breq        tic01
                dec         tica
Tic01:          tst         ticb
                breq        tic02
                dec         ticb
Tic02:          out         SREG, TEMPF          ; Restor status
                reti

; This ISR will handal end of time 0 overflows
TIM0_OVF:       ; we ret at vector
                reti

; This ISR will handal changes in FC Volts it will retern to last place
ANA_COMP:
                ; we may whant to fix timer for fast service in main

                reti

ADC:            reti

EE_RDY:         reti                             ; This ISR may be used
later

TIM1_OVF:       reti                             ; This ISR will be
disabled
```

*FIG._24d*

```
;   Rutine to manage low fuel flasher
;   The two byte flash count also acts as a run flag as follows:
;          Low byte not 0, the counter is active and flashing
;          Low byte equ 0, the high byte has meaning as follws:
;                  0 =  clear to start flashing
;                  1 =  flash time complet
;
;                  any other go to sleep


FLASH:          ; Start Flasher

                tst      TICA                 ; test for time to run
                brne     FLASHEND             ; must be zero th run
                ldi      TICA, TICFLASH       ; reset the timer

                tst      FLASHLOW             ; test for need
                brne     FLASH10              ; go to flashing
                tst      FLASHHIGH            ; test for stoped
                brne     FLASHEND             ; the flasher is stoped

                ; Start the flasher
                ldi      FLASHLOW, LOW(FLASHSET)
                ldi      FLASHHIGH, HIGH(FLASHSET)

FLASH10:        ; flash the LED
                cbi      PORTB, LED           ; LED lamp on

                ; time the flash
                ldi      TEMP, TIME40m        ; load time value
                rcall    WATE                 ; wate for time
                ;out     TCNT0, TEMP
                ;ldi     TEMP, MCUCRSET       ; set for idel
                ;out     MCUCR, TEMP
                ;sleep

                : stop the flash
                sbj      PORTB, LED           ; LED lamp off

                ; count the flashes
                inc      FLASHLOW             ; Adjust Count
                brne     FLASHEND
                inc      FLASHLOW             ; Can not be zero
                inc      FLASHHIGH            ; Adjust high byte
                brne     FLASHEND
                clr      FLASHLOW             ; Flash time is over stop flash
                inc      FLASHHIGH            ; Set stoped

FLASHEND:       ret

ADCRUN:         ; rutine for ADC
                ldi      TEMP, ADMUXSET
                add      TEMP, ZH
                out      ADMUX, TEMP          ; Set adc chanel
                sbi      ADCSR, ADSC          ; Start the ADC Conversion
                ;ldi     TEMP, MCUCRADC       ; set for ADC
                :out     MCUCR, TEMP
                ;sleep                        ; wate for adc end
ADCRUN01:       sbis     ADCSR, ADIF          ; Test for end of conversion
                rjmp     ADCRUN01             ; Loop till end
                in       TEMP, ADCL           ; Get the resulats
                st       Z, TEMP
                inc      ZL
                in       TEMP, ADCH           ; Get the resulats
                st       Z, TEMP
```

FIG._24e

```
                ret

LOADTEST:       clr         LOADOK              ; make load not OK
                ; work load test
                tst         TICB                ; test for time to run
                brne        LOADTESTEND         ; must be zero th run
                ldi         TICB, TICLOAD       ; reset the timer


                sbi         DDRB, LOAD          ; start Load by seting output

                ; time the load
                ldi         TEMP, TIME20m       ; load timer to start
                rcall       WATE

                ;out        TCNT0, TEMP
                ;ldi        TEMP, MCUCRSET      ; set for idel
                ;out        MCUCR, TEMP
                ;sleep      ; wate for time

                ; read adc ch for SVFC
                ldi         ZH,SVFC             ; set chanel
                ldi         ZL, VFCLAN          ; data store pointer
                rcall       ADCRUN

                cbi         DDRB, LOAD          ; stop Load by try stating

                ; find load dif
                mov         VFCDIFLOW, VFCBALOW
                mov         VFCDIFHIGH, VFCBAHIGH
                sub         VFCDIFLOW, VFCLALOW
                sbc         VFCDIFHIGH, VFCLAGHIGH

                ; test dif
                cpi         VFCDIFLOW, low(loaddelta)
                ldi         TEMP, high(loaddelta)
                cpc         VFCDIFHIGH, TEMP
                brsh        LOADTESTEND
LOAD10:         doc         LOADOK              ; set load OK $FF

LOADTESTEND:    ret


; rutine to use timer 0 for wating, Temp time

WATE:           ;
                out         TCNT0, TEMP
                ldi         TEMP, MCUCRSET      ; set for idel
                out         MCUCR, TEMP
                sleep       ; wate for time
                ret

Trace:          ; A lamp blinb rutine for testing
                sbic        PINb, led
                rjmp        Tracel
                sbi         PORTb, led
                cbi         PORTb, onnot
                rjmp        Traceend
Tracel:         cbi         PORTb, led
                sbi         PORTb, onnot
Traceend:       ret

EXIT
```

*FIG._24f*

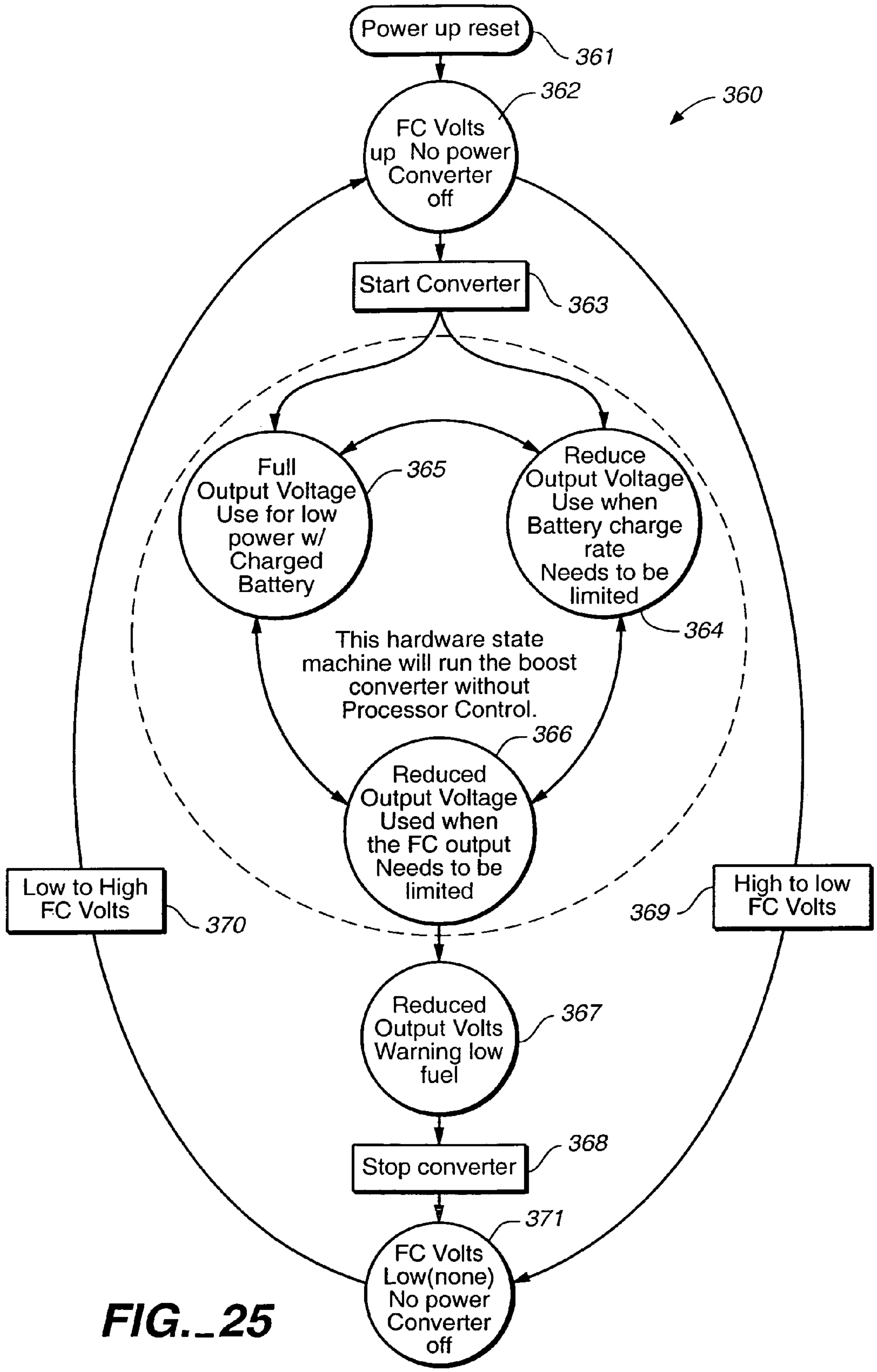
FIG._25

FUEL CELL ASSEMBLY FOR PORTABLE ELECTRONIC DEVICE AND INTERFACE, CONTROL, AND REGULATOR CIRCUIT FOR FUEL CELL POWERED ELECTRONIC DEVICE

RELATED APPLICATIONS

This application claims priority to U.S. Provisional Patent Application No. 60/295,114, filed Jun. 1, 2001 and entitled Fuel Cell Assembly for Portable Electronic Devices, the entire contents of which is incorporated herein by this reference.

This application also claims priority to U.S. Provisional Patent Application No. 60/295,475, filed Jun. 1, 2001 and entitled Interface, Control, and Regulator Circuit for Fuel Cell Powered Electronic Device, the entire content of which is incorporated herein by this reference.

TECHNICAL FIELD

This invention relates to a new and improved fuel cell assembly for portable electronic devices and to an interface, control, and regulator circuit for fuel cell powered electronic devices. More particularly, the present invention is directed to a liquid feed direct methanol polymer electrolyte membrane fuel cell assembly for portable electronic devices. This invention also relates to a new and improved interface, control, and regulator circuit for fuel cell powered electronic devices.

BACKGROUND OF THE INVENTION

Polymer electrolyte membranes are useful in electrochemical devices such as batteries and fuel cells because they function as electrolyte and separator. Such membranes may be readily fabricated as thin flexible films which can be incorporated into cells of variable shape.

Perfluorinated hydrocarbon sulfonate ionomers, such as NAFION® by DuPont or analogous Dow perfluorinated polymers, are currently being used as polymer electrolytes for fuel cells. Such prior membranes, however, have some severe limitations for use in both hydrogen/air fuel cells and liquid feed direct methanol fuel cells.

An exemplar of a fuel cell which incorporates such a prior membrane is U.S. Pat. No. 5,759,712 to Hockaday which shows a surface replica fuel cell for a micro fuel cell electrical power pack. The disclosed micro fuel cell electrical power pack is configured to power a cellular phone. An evaporative manifold is provided for wicking out fuel from a fuel tank bottle.

What is needed, among other things, is a fuel cell assembly having a removable fuel cartridge capable of maintaining a positive pressure to facilitate flow of fuel from the cartridge to the fuel cell assembly.

Furthermore, fuel cell systems for powering electronic devices have not heretofore achieved any measure of commercial success, at least in part because of the difficulties associated with (i) providing a fuel cell in a physical package that would be adopted by device manufactures, particularly for mobile telephone applications, and (ii) achieving and regulating required power (voltage and current) levels with acceptable reliability, consistency, and safety.

These limitations have been particularly problematic where the power requirements of the electronic device tend to vary at different phases of operation. For example, in a mobile cellular phone, the power requirements are quite modest for standby operation while waiting to receive a call, increase when receiving the call, and then raise tremendously while in a transmit mode. These and other circumstances require or benefit from a interface and control circuit that permits connection of a fuel cell based power supply to electronic devices and advantageously connection and interchangeable use or retrofit of fuel cell based power supplies or systems to existing electronic devices.

What is needed, among other things, is an interface circuit adapted to control and regulate power draw and charge/discharge from both the fuel cell and the battery to maintain operation within predefined voltage, current, and power ranges and to maintain safety when either or both flammable fluids associated with operation of the fuel cell and explosive materials associated with the operation of Lithium-Ion batteries are present.

SUMMARY OF THE INVENTION

In summary, one aspect of the present invention is directed to a removable fuel cartridge for a direct methanol fuel cell assembly including an expandable fuel bladder for receiving liquid methanol fuel, an expandable pressure member in contact with the bladder for maintaining a positive pressure on the bladder, and a sealable exit port in fluid communication with the bladder.

Another aspect of the present invention is directed to a direct methanol fuel cell assembly for a portable electronic device including a membrane electrode assembly, a removable fuel cartridge, and a fuel delivery system. The membrane electrode assembly includes an anode, a cathode, and a polymer electrolyte membrane having a fuel side and an oxygen side. The removable fuel cartridge includes an expandable fuel bladder for receiving liquid fuel, an expandable pressure member in contact with the bladder for maintaining a positive pressure on the bladder, and a sealable exit port in fluid communication with the bladder. The fuel delivery system delivers fuel from the cartridge to the fuel side of the membrane. The circuit engages the port for fluidly connecting the bladder to the fuel side of the membrane.

Another aspect of the present invention is directed to a direct methanol fuel cell assembly for a portable electronic device including a membrane electrode assembly, an anode plate, a removable fuel cartridge, and a cathode plate. The membrane electrode assembly includes an anode, a cathode, and a polymer electrolyte membrane having a fuel side and an oxygen side. The anode plate includes a fuel chamber fluidly connected to the fuel side of the membrane. The removable fuel cartridge fluidly connects to the fuel chamber. The cathode plate includes an oxygen port extending therethrough for providing air to the oxygen side of the membrane.

Yet another aspect of the present invention is directed to a power pack specifically adapted to replace a battery for a cellular phone having a cellular phone body. The power pack includes a fuel cell assembly, a removable fuel cartridge, and a housing adapted to removably engage the cellular phone body. The removable fuel cartridge provides fuel to the fuel cell assembly and includes an expandable fuel bladder for receiving liquid fuel, an expandable pressure member in contact with the bladder for maintaining a positive pressure on the bladder, and a sealable exit port in fluid communication with the bladder. The housing encloses the fuel cell assembly and the fuel cartridge.

An object of the present invention is to provide a compact fuel cell assembly for mobile telephones and other portable electronic devices.

Another object of the present invention is to provide a fuel cell assembly for portable electronic devices which can be quickly refueled thus alleviating the need of lengthy periods of time required to recharge batteries.

Yet another object of the present invention is to provide a fuel cell assembly which can be quickly and conveniently refueled with replaceable fuel cartridges which maintain a positive pressure of fuel.

Still another aspect of the present invention is directed to an interface circuit adapted to control and regulate power drawn and charge/discharge from a fuel cell and maintain safe operation within predefined voltage, current, and power ranges.

Yet another aspect of the present invention is directed to a method for controlling operation of a voltage boost converter circuit coupled to a fuel cell and other energy storage device such as a battery and/or storage capacitors.

Still another aspect of the present invention is directed to a computer program and computer program product for controlling a microprocessor.

Even still another aspect of the present invention is directed to a method and system for boosting a fuel cell voltage up to cellular phone voltage and managing the process of boosting the voltage in a safe and efficient manner.

Yet another aspect of the present invention is to provide an interface and control circuit for safe efficient operation of a fuel cell powered electronic device such as a mobile telephone, portable computer, PDA, or other portable electronic device.

The accompanying drawings, which are incorporated in and form a part of this specification, illustrate embodiments of the invention and, together with the description, serve to explain the principles of the invention.

BRIEF DESCRIPTION OF THE DRAWINGS

FIG. 1 is a perspective view schematically showing a fuel cell assembly in combination with a portable electronic device in accordance with the present invention.

FIG. 2 is an exploded front perspective view of the fuel cell assembly shown in FIG. 1 with the portable electronic device removed.

FIG. 3 is an exploded rear perspective view of the fuel cell assembly shown in FIG. 2.

FIG. 4 is a schematic view of a membrane electrode assembly of the fuel cell assembly shown in FIG. 1.

FIG. 5 is an enlarged schematic cross sectional view of the membrane electrode assembly of FIG. 4 shown without electrodes.

FIG. 6 is a perspective view of an anode plate shown in FIGS. 2 and 3.

FIG. 7 is a perspective view of the removable fuel cartridge shown in FIGS. 2 and 3 schematically showing an expandable fuel bladder and an expandable pressure member.

FIG. 8 is an exploded side perspective view of an alternative fuel cell assembly with the portable electronic device removed, similar to that shown in FIG. 1.

FIG. 9(*a*) is an enlarged plan view of a cathode plate of the fuel cell assembly of FIG. 8.

FIG. 9(*b*) is an enlarged cross-sectional view of the cathode pate of FIG. 9 taken along line 9—9 in FIG. 9(*a*).

FIG. 10 is an exploded front perspective view of a removable fuel cartridge of the fuel cell assembly shown in FIG. 8.

FIG. 11 is an exploded front perspective view of a modified removable fuel cartridge, similar to that shown in FIG. 10, for the fuel cell assembly shown in FIG. 8.

FIG. 12(*a*) is an enlarged, exploded perspective view of a two-way valve assembly for the fuel cell assembly of FIG. 8.

FIG. 12(*b*) is an enlarged perspective view of the two-way valve assembly of FIG. 12(*a*).

FIG. 13 is a schematic circuit diagram showing an alternative embodiment of an interface and control circuit for use in combination with a fuel cell, a battery, and an electronic device powered by one or both of the fuel cell and battery in accordance with the present invention.

FIG. 14 is a diagrammatic flow-chart illustration showing an embodiment of a procedure for controlling aspects of operation of the interface and control circuit of FIG. 13.

FIG. 15 is a diagrammatic illustration showing an exemplary power curve for a fuel cell.

FIG. 16 is a diagrammatic flow-chart illustration showing an embodiment of an initialization procedure in accordance with the present invention.

FIG. 17 is a diagrammatic flow-chart illustration showing an embodiment of TIC ISR procedure in accordance with the present invention.

FIG. 18 is a diagrammatic flow-chart illustration showing an embodiment of a TO Overflow ISR procedure in accordance with the present invention.

FIG. 19 is a diagrammatic flowchart illustration showing an embodiment of Compare ISR procedure in accordance with the present invention.

FIG. 20 is a diagrammatic flow-chart illustration showing an embodiment of a Flash procedure in accordance with the present invention.

FIG. 21 is a diagrammatic flow-chart illustration showing an embodiment of a Load Test procedure in accordance with the present invention.

FIG. 22 is a diagrammatic flowchart illustration showing an embodiment of a ADC procedure in accordance with the present invention.

FIG. 23 is a diagrammatic flow-chart illustration showing an embodiment of a Wait procedure in accordance with the present invention.

FIG. 24 is an illustration showing exemplary code for use with an embodiment of the invention utilizing a microprocessor to accomplish a portion of the control in accordance with the invention.

FIG. 25 is an illustration showing exemplary state diagram for operation of the inventive circuit in accordance with one embodiment of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defied by the appended claims.

An acidic polymer contains acidic subunits which preferably comprise acidic groups including sulphonic acid, phosphoric acid and carboxylic acid groups. Examples of polymers containing sulfonic acid group include perfluorinated sulfonated hydrocarbons, such as NAFION®; sulfonated aromatic polymers such as sulfonated polyetheretherketone (sPEEK), sulfonated polyetherethersulfone (sPEES), sulfonated polybenzobisbenzazoles, sulfonated polybenzothiazoles, sulfonated polybenzimidazoles, sulfonated polyamides, sulfonated polyetherimides, sulfonated polyphenyleneoxide, sulfonated polyphenylenesulfide, and other sulfonated aromatic polymers. The sulfonated aromatic polymers may be partially or fully fluorinated. Other sulfonated polymers include polyvinysulfonic acid, sulfonated polystyrene, copolymers of acrylonitrile and 2-acrylamido-2-methyl-1 propane sulfonic acid, acrylonitrile and vinylsulfonic cid, acrylonitrile and styrene sulfonic acid, acrylonitrile and methacryloxyethyleneoxypropane sulfonic acid, acrylonitrile and methacryloxyethyleneoxytetrafluoroethylenesulfonic acid, and so on. The polymers may be partially or fully fluorinated. Any class of sulfonated polymer include sulfonated polyphosphazenes, such as poly (sulfophenoxy)phosphazenes or poly(sulfoethoxy)phosphazene. The phosplazene polymers may be partially or fully fluorinated. Sulfonated polyphenylsiloxanes and copolymers, poly(sulfoalkoxy)phosphazenes, poly(sulfotetrafluoroethoxypropoxy)siloxane. In addition, copolymers of any of the polymers can be used. It is preferred that the sPEEK be sulfonated between 60 and 200%, more preferably between 70 to 150% and most preferably between 80 to 120%. In this regard, 100% sulfonated indicates one sulfonic acid group per polymer repeating unit.

Examples of polymers with carboxylic acid groups include polyacrylic acid, polymethacrylic acid, any of their copolymers including copolymers with vinylimidazole or acrylonitrile, and so on. The polymers may be partially or fully fluorinated.

Examples of acidic polymers containing phosphoric acid groups include polyvinylphosphoric acid, polybenzimidazole phosphoric acid and so on. The polymers may be partially or fully fluorinated.

A basic polymer contains basic subunits which preferably comprise basic groups such as aromatic amines, aliphatic amines or heterocyclic nitrogen containing groups. Examples of basic polymers include aromatic polymers such as polybenzimidazole, polyvinylimidazole, N-alkyl or N-arylpolybenzimidazoles, polybenzothiazoles, polybenzoxazoles, polyquinolines, and in general polymers containing functional groups with heteroaromatic nitrogens, such as oxazoles, isooxazoles, carbazole, indoles, isoindole, 1,2,3-oxadiazole, 1,2,3-thiadiazole, 1,2,4-thiadiazole, 1,2,3-triazole, benzotriazole, 1,2,4-traozole, tetrazole, pyrrole, N-alkyl or N-aryl pyrrole, pyrrolidine, N-alkyl and N-arylpyrrolidine, pyridine, pyrrazole groups and so on. These polymers may be optionally partially or fully fluorinated. Examples of aliphatic polyamines include polyethyleneimines, polyvinylpyridine, poly(allylamine), and so on. These basic polymers may be optionally partially or fully fluorinated. Polybenzimidazole (PBI) is a preferred basic polymer. Polyvinylimidazole (PVI) is a particularly preferred basic polymer.

An elastomeric polymer comprises elastomeric subunits which preferably contain elastomeric groups such as nitrile, vinylidene fluoride, siloxane and phosphazene groups. Examples of elastomeric polymers include polyacrylonitrile, acrylonitrile copolymers, polyvinyilidene fluoride, vinylidene fluoride copolymers, polysiloxanes, siloxane copolymers and polyphosphazenes, such as poly(trifluormethylethoxy)phosphazene.

The elastomeric polymer may be added to the polymer membrane in the form of polymerizable monomer to fabricate semi-interpenetrating networks. The monomers may be polymerized photochemically or by thermal treatment for the semi-IPN.

An elastomeric copolymer may refer to an elastomeric polymer which contains elastomeric subunits and one or more acidic subunits or basic subunits. For example, if an acidic polymer such as sPEEK is used, an elastomeric copolymer comprising elastomeric subunits and basic subunits may be used in a binary composition. Alternatively, should a basic polymer be used, the elastomeric copolymer will comprise elastomeric subunits and acid subunits. Such binary mixtures may be used in conjunction with other polymers and copolymers to form additional compositions.

As used herein, an membrane electrode assembly (MEA) refers to a polymer membrane (PEM) made according to the present invention in combination with anode and cathode catalysts positioned on opposite sides of the polymer electrolyte membrane. It may also include anode and cathode electrodes which are in electrical contact with the catalysts layers.

A fuel cell assembly 31 for a portable electronic device 32 in accordance with the present invention is shown in FIG. 1. In the illustrated embodiment, the fuel cell assembly is a direct methanol fuel cell assembly and the portable electronic device is a mobile telephone. Methanol is a convenient liquid source of fuel which is easy to handle and is readily contained in a simple plastic enclosure. Methanol is also relatively inexpensive and is presently widely available. One should appreciate that other types of fuel can be used.

Fuel cell assembly 31, as illustrated, is adapted for use with a mobile telephone such as a cellular phone. For example, fuel cell assembly 31 can be configured to provide a continuous source of power for a mobile telephone which typically having a power consumption ranging between 360 mA at 3.3 V (1.2 W), when located nearest to a respective transmitter, and 600 mA at 3.3 V (1.98 W) when located furthest from a respective transmitter. One should appreciate, however, that a fuel cell assembly in accordance with the present invention can be configured to provide a continuous source of power for other portable electronic devices having various power consumption ranges and still fall within the scope of the present invention. For example, a fuel cell assembly in accordance with the present invention can be used to power personal digital assistants (PDA's), notebooks and laptop computers, portable compact disc players, and other portable electronic devices.

As shown in FIGS. 2 and 3, fuel cell assembly 31 generally includes a membrane electrode assembly 33, an anode plate 37, a cathode plate 38, a removable fuel cartridge 39, a fuel delivery system 40, and a voltage regulator 41. Fuel cell assembly 31 is assembled using various fasteners and/or snap-fit components and/or pressure sensitive adhesives. For example, threaded fasteners 42 extend through cathode plate 38, extend through assembly apertures 43, 44 and 45 located in a cathode electrode 48, membrane electrode assembly 33 and an anode electrode 49, respectively, and extend into assembly apertures 50 located on anode plate 37 and cooperate with nuts **5*l*, as viewed from left to right in FIG. 2. Pressure sensitive adhesives applied to abutting surfaces of the above components can supplement or take the place of the threaded fasteners 42**. One should appreciate, however, that other methods of assembly can be used.

The electrodes are in electrical contact with a polymer electrolyte membrane 53, either directly or indirectly, and are capable of completing an electrical circuit which includes polymer electrolyte membrane 53 and a load of portable electronic device 32 to which a electric current is supplied. More particularly, a first catalyst 54 is electrocatalytically associated with the anode side of polymer electrolyte membrane 53 so as to facilitate the oxidation of an inorganic fuel such as methanol as schematically shown in FIG. 4. Such oxidation generally results in the formation of protons, electrons, carbon dioxide and water. Since polymer electrolyte membrane 53 is substantially impermeable to organic fuels such as methanol, as well as carbon dioxide, such components remain on the anodic side of polymer electrolyte membrane 53. Electrons formed from the electrocatalytic reaction are transmitted from cathode electrode 48 to the load and then to anode electrode 49. Balancing this direct electron current is the transfer of protons or some other appropriate cationic species, i.e., an equivalent number of protons, across the polymer electrolyte membrane to the anodic compartment. There an electro-catalytic reduction of oxygen in the presence of the transmitted protons occurs to form water.

Membrane electrode assembly 33 is generally used to divide fuel cell assembly 31 into anodic and cathodic compartments. In such fuel cell systems, an organic fuel such as methanol is added to the anodic compartment while an oxidant such as oxygen or ambient air is allowed to enter the cathodic compartment. Depending upon the particular use of a fuel cell assembly, a number of individual fuel cells can be combined to achieve appropriate voltage and power output. Such applications include electrical power sources for portable electronic devices such as cell phones and other telecommunication devices, video and audio consumer electronics equipment, computer laptops, computer notebooks, personal digital assistants and other computing devices, geographic positioning systems (GPS's) and the like.

Membrane electrode assembly 33 includes a plurality of membrane electrode assembly cells, each cell generally including one anode electrode 49, one cathode electrode 50, and one polymer electrolyte membrane 53. Each polymer electrolyte membrane is a continuous sheet with catalytic layers. The polymer electrolyte membrane forms an electrolyte between the catalytic layers and is sandwiched together with the catalytic layers between the anode and cathode electrodes. Polymer electrolyte membrane 53 has a fuel side and an oxygen side located adjacent anode electrode 49 and cathode electrode 48, respectively, as schematically shown in FIG. 4. Membrane electrode assembly 33 further includes first catalyst 54 and a second catalyst 59 positioned respectively on the fuel side and the oxygen side of polymer electrolyte membrane 53. The catalyst on the anodic side of the polymer electrolyte membrane is preferably a platinum ruthenium catalyst while the catalyst on the cathode side is preferably a platinum catalyst.

Anode electrode 49 is in electrical communication with first catalyst 54 and cathode electrode 48 is in electrical communication with second catalyst 59. In one embodiment, the electrodes are formed of gold plated stainless steel. The electrodes of each membrane electrode assembly cell are dimensioned and configured to provide electrical contact between the electrode and a respective catalyst layer of the membrane electrode assembly cell. Preferably, each electrode includes a copper tab.

FIG. 5 is a cross section of membrane electrode assembly 33, without electrodes. The membrane electrode assembly includes the polymer electrolyte membrane, the first and second catalyst layers and generally at least one water and gas permeable layer on the cathodic side to provide for the transport of air to and water from the cathode catalyst layer. Generally a carbon paper or carbon cloth is used for such purposes. In addition, a carbon backing is preferably provided on the anode catalyst layer to protect the catalyst layer from damage from the electrodes. Since the backings generally contain conductive material such as carbon, the electrodes can be placed directly on the backing to complete the membrane electrode assembly.

Various membranes can be utilized in accordance with the present invention. For example, a perfluorinated hydrocarbon sulfonate ionomer, such as NAFION® can be used to form the polymer electrolyte membrane in accordance with the present invention. One should appreciate that other membranes can be used.

In one embodiment, a polymer electrolyte membrane includes first, second and optionally third polymers wherein the first polymer is an acidic polymer including acidic subunits, the second polymer is a basic polymer including basic subunits, and wherein (i) the optional third polymer is an elastomeric polymer including blastomeric subunits, or (ii) at least one of the first or second polymers is an elastomeric copolymer further including an elastomeric subunit. Such a polymer electrolyte membrane and a polymer composition therefore are described, as are a membrane electrode assembly, a fuel cell, and an electrochemical device utilizing such a membrane, in copending U.S. patent application Ser. No. 09/872,770, filed Jun. 1, 2001 and entitled POLYMER COMPOSITION, and the corresponding international application, International Publication No. WO 01/94450 A2, published Dec. 13, 2001 and also entitled POLYMER COMPOSITION, the entire contents of which applications are incorporated herein by this reference.

With reference to FIG. 2, anode plate 37 includes an internal recess which forms a fuel chamber 60 fluidly connected to the fuel side of polymer electrolyte membrane 53. Anode plate 37 includes a plurality of posts 61 extending through fuel chamber 60 toward anode electrode 49 for biasing anode electrode 49 into electrical contact with polymer electrolyte membrane 53. Anode plate 37 includes a plurality of exhaust ports 64, shown in FIG. 6. Exhaust ports extend through side walls 65 thus providing an exhaust port which allows carbon dioxide formed within fuel chamber 60 to flow from the fuel chamber.

Cathode plate 38 forms an enclosure or shell 66 having a recess 70 which receives membrane electrode assembly 33, anode plate 37, and removable fuel cartridge 39. Enclosure 66 also includes engagement structure for selectively engaging a mobile telephone or other portable electronic device. The illustrated enclosure includes an engagement track 71 extending along each side wall 72 of the enclosure for slidably engaging portable electronic device 32. Enclosure 66 also includes an engagement tab 75 for selectively latching fuel cell assembly 31 to portable electronic device 32. Contacts for transferring electrical power to the mobile phone are also provided (not shown).

The enclosure is injection molded, however, one should appreciate that other methods of forming the enclosure can be utilized. For example, the enclosure can be machined and the like.

In the embodiment shown in FIG. 1, enclosure 66 includes a plurality of air grooves 76 engineered into an outer surface 77 of enclosure 66 which would normally be in contact with the hand of a mobile telephone user. Intake ports 82 are located in one or more grooves 76 for supplying oxygen to the cathodic chamber. In particular, oxygen intake ports 82 extend from a base of one or more grooves 76 to the oxygen side of polymer electrolyte membrane 53. Such a configuration minimizes the impedance of gas flow through the exhaust ports and the intake ports by the palm of a user's hand.

Removable fuel cartridge 39 generally includes an expandable fuel bladder 86, an expandable pressure member 87, and a sealable exit port 88, as shown schematically in FIG. 7. Removable fuel cartridge 39 includes a rigid canister 92 enclosing expandable fuel bladder 86 and the expandable pressure member. The fuel cartridge is dimensioned and configured such that the fuel bladder is capable of holding at least approximately 5 cubic centimeters of methanol, preferably at least approximately 7 cubic centimeters of methanol, and most preferably at least approximately 10 cubic centimeters. In the illustrated embodiment, a pair of spring clips 93 is provided to engage canister 92 with enclosure 66 and hold the canister in place until a user removes canister 92 from the enclosure to refuel fuel cell assembly 31.

Expandable fuel bladder 86 receives liquid fuel which is to be supplied to membrane electrode assembly 33. Expandable fuel bladder 86 is formed of a sheet plastic material which is substantially impervious to methanol. Examples of suitable sheet plastic material include nylon, urethane and polyethylene, however, one should appreciate that other materials can be used.

Expandable pressure member 87 contacts fuel bladder 86 in such a manner that a positive pressure is maintained on and within the bladder. Sealable exit port 88 fluidly communicates with fuel bladder 86. In the illustrated embodiment, expandable pressure member 87 is a compressed foam member, preferably formed of open cell foam. The compressed foam member is elastic and acts a spring member biased against fuel bladder 86 thus maintaining a positive pressure on the bladder. Other pressure members can be utilized in accordance with the present invention. For example, a spring biased member can exert a force against fuel bladder 86 in order to maintain a positive pressure on the bladder.

In the illustrated embodiment, sealable exit port 88 of the replaceable fuel cartridge 39 includes a septum 94, as shown in FIG. 7. Septum 94 includes a substantially self-sealing membrane. Referring to FIG. 3, fuel delivery system 40 includes a needle 97 which extends into exit port 88, and through septum 94 for fluidly connecting fuel bladder 86 to the fuel side of polymer electrolyte membrane 53. Sealable exit port 88 is dimensioned and configured to cooperate with needle 97 In one embodiment, the sealable exit port includes an INTERLINK® fluid connection adaptor which is manufactured by Baxter International Inc. of Deerfield, Ill. In particular, fuel delivery system 40 includes needle 97 which is insertable into septum 94. One should appreciate that other types of fluid connectors can be utilized in accordance with the present invention.

Enclosure 66 is also provided with a release latch 98 for disengaging removable fuel cartridge 39 from fuel delivery system 40. Release latch 98 is slidably disposed on one side of enclosure 66 and engages septum 94 of removable fuel cartridge 39. Sliding release latch 98 downward, as viewed in FIG. 2, will push against exit port 88 and thus push removable fuel cartridge 39 at least partially outward past a bottom wall 103 of enclosure 66 and thus at least partially disengage removable fuel cartridge 39 from fuel delivery system 40.

Fuel delivery system 40 fluidly connects fuel bladder 86 of replaceable fuel cartridge 39 to fuel chamber 60 of anode plate 37. Fuel delivery system 40 includes needle 97, a needle block 105, a one-way duck-bill valve 108, a manifold block 109, and a manifold 110 connected in series to interconnect fuel bladder 86 and fuel chamber 60. Needle block 105 supports needle 97 and positions the needle for piercing exit port 88 of removable fuel cartridge 39 as the fuel cartridge is inserted into fuel cell assembly 31. Needle block 105 fluidly interconnects needle 97 and one-way duck-bill valve 108. Preferably needle block 105 includes a barb fitting for engaging one end of duck-bill valve 108.

One-way duck-bill valve 108 is provided for preventing fuel from flowing through fluid delivery system 40 away from fuel chamber 60 and the fuel side of polymer electrolyte membrane 53. One-way duckbill valve 108 is engageable with a protrusion 115 on canister 92 of removable fuel cartridge 39 such that valve 108 is closed when fuel cartridge 39 is removed from fuel cell assembly 31 and such that valve 108 is opened when the fuel cartridge is inserted into the fuel cell assembly. One should appreciate that other one-way valves can be utilized in accordance with the present invention. When fuel cartridge 39 is inserted into fuel cell assembly 31, one-way valve 108 remains open allowing fuel to flow from the cartridge to fuel chamber 60 thus allowing mass transport to occurs within the fuel chamber. Fuel flow from fuel cartridge 39 toward fuel chamber 60 is facilitated by the positive pressure maintained on the fuel bladder 86.

Manifold block 109 fluidly interconnects one-way duck-bill valve 108 and manifold 110. Preferably manifold block 109 includes a barb fitting for engaging the other end of duck-bill valve 108. Manifold 110 fluidly communicates with a plurality of fuel intake ports 119 located in and extending through a base wall 120 of anode plate 37 as illustrated in FIG. 6. Although fuel intake ports 119 are shown to extend through base wall 120 of anode plate 37, one should appreciate that fuel intake ports can be provided elsewhere on the anode plate.

Voltage and current regulator 41, shown in FIGS. 1 and 2, includes a circuit and a storage battery for monitoring and/or regulating voltage and/or power supplied to portable electronic device 33. Regulator 41 is described in copending U.S. Provisional Application for Patent No. 60/295,475, filed Jun. 1, 2001, entitled INTERFACE, CONTROL, AND REGULATOR CIRCUIT FOR FUEL CELL POWERED ELECTRONIC DEVICE, filed Jun. 1, 2001, a copy of which is attached as Appendix A and incorporated herein by this reference.

In operation and use, a user will insert a removable fuel cartridge 39 into fuel cell assembly 31 such that needle 87 pierces septum 94 thus allowing fuel to flow from fuel bladder 86 to polymer electrolyte membrane 53 of membrane electrode assembly 33. Once fuel is substantially depleted from fuel cartridge 39, the user slides release latch 98 downward and disengages the fuel cartridge from fuel cell assembly 31. The user then replaces the depleted fuel cartridge with a fresh, that is, a fuel cartridge fully charged with fuel and inserts the fresh cartridge in the same manner described above.

In another embodiment of the present invention shown in FIG. 8, fuel cell assembly **31*a* is similar to fuel cell assembly 31 described above but includes several modifications as discussed below. Like reference numerals have been used to describe like components of fuel cell assembly 31 and fuel cell assembly 31*a***.

As shown in FIG. 8, fuel cell assembly **31*a* generally includes a membrane electrode assembly 33*a*, an anode plate 37*a*, a cathode plate 38*a*, a removable fuel cartridge 39*a*, a fuel delivery system 40*a* and a voltage regulator 41*a*. Fuel cell assembly 31*a* is assembled using threaded fasteners 42*a* which extend through cathode plate 38*a*, cathode electrode 48***a*, membrane electrode assembly 33*a*, anode electrode 49*a*, and anode plate 37*a* and cooperate with nuts 51*a*, in the same manner as discussed above with reference to the embodiment shown in FIG. 2.

The electrodes are in electrical contact with a polymer electrolyte membrane 53*a*, either directly or indirectly, and are capable of completing an electrical circuit which includes polymer electrolyte membrane 53*a* and a load of the portable electronic device to which a electric current is supplied in the same manner as discussed above. Membrane electrode assembly 33*a* is generally used to divide fuel cell assembly 31*a* into anodic and cathodic compartments.

In this embodiment, cathode plate 38*a* is formed of anodized aluminum. One should appreciate, however, that other materials can also be used in accordance with the present invention. For example, the cathode plate can be formed of polycarbonate or other suitable materials. As aluminum is an electrical conductor, cathode plate 38*a* is anodized to provide a layer of electrical insulation. One should appreciate that other forms of insulation may be used instead of, or in addition to, anodizing the cathode plate.

Preferably, an insulation layer 122 is also provided between cathode plate 38*a* and cathode electrode 48*a* in order to further protect the aluminum cathode plate from shorting individual cells within the fuel cell assembly which would reduce performance significantly. For example, in the event that the anodizing of the cathode plate is scratched the insulation layer would protect the cathode pate from shorting one or more cells. In the illustrated embodiment, insulation layer 122 is formed of vinyl, however, one should appreciate that other electrically insulating materials can be used in accordance with the present invention.

With reference to FIG. 8, anode plate 37*a* includes an internal recess which forms a fuel chamber fluidly connected to the fuel side of polymer electrolyte membrane 53*a*. Anode plate 37*a* includes a plurality of posts 61*a* extending through the fuel chamber toward anode electrode 49*a*, in the same manner as anode plate 37 described above, for biasing anode electrode 49*a* into electrical contact with polymer electrolyte membrane 53*a*.

Cathode plate 38*a* in combination with enclosure or shell 66*a* defines a recess which receives membrane electrode assembly 33*a*, anode plate 37*a*, and removable fuel cartridge 39*a*. Enclosure 66*a* also includes engagement structure for selectively engaging a mobile telephone or other portable electronic device. Preferably, the enclosure is formed of anodized aluminum or other suitable material similar to that of the cathode plate. The illustrated enclosure includes an engagement track 71*a* extending along each side wall of the enclosure 66*a* for slidably engaging a portable electronic device.

As shown in FIG. 9(*b*), cathode plate 38*a* has a convex shape and plurality of laterally extending air grooves 76*a* engineered into the outer convex surface 77*a* of cathode plate 38*a*. In the event that fuel cell assembly 31*a* is used in combination with a mobile telephone, outer surface 77*a* would normally be in contact with the hand of a mobile telephone user during use. Air grooves 76*a* are formed between a plurality of wide or tall laterally-extending webs 124. Intake ports 82*a* are located in one or more grooves 76*a* for supplying oxygen to the cathodic chamber. Tall webs 124 intersect with a plurality of narrow or short longitudinally-extending webs 125 thereby forming the oxygen intake ports 82*a*. Intake ports 82*a* extend to the oxygen side of polymer electrolyte membrane 53*a*. Such a configuration minimizes the impedance of gas flow through the exhaust ports and the intake ports by the palm of a user's hand.

The curved configuration of cathode plate 38*a* further allows side-venting when cathode plate 38*a*, and any portable electronic device connected thereto such as a mobile telephone, even when the assembly is placed on a flat surface such as a table or a seat. In the embodiment illustrated in FIG. 9(*b*), cathode plate 38*a* has a convex profile, however, one should appreciate that a convex profile and other curved profiles can also be used in accordance with the present invention Removable fuel cartridge 39*a* generally includes an expandable fuel bladder 86*a*, a pair of expandable pressure members 87*a*, and a sealable exit port 88*a*, as shown in FIG. 10. Removable fuel cartridge 39*a* includes a rigid canister 92*a* formed of anodized aluminum or other suitable material including, but not limited to polycarbonate or stamped sheet metal. Canister 92*a* encloses expandable fuel bladder 86*a* and the expandable pressure members 87*a*.

Expandable fuel bladder 86*a* receives and stores liquid fuel which is to be supplied to membrane electrode assembly 33*a*. Expandable fuel bladder 86*a* is plastic material which is substantially impervious to methanol and is vacuum-formed to conform to the interior shape of canister 92*a*. The vacuumed-formed configuration of fuel bladder 86*a* significantly increases fluid storage within canister 92*a*. Sealable exit port 88*a* fluidly communicates with fuel bladder 86*a*.

Expandable pressure members 87*a* contact fuel bladder 86*a* in such a manner that a positive pressure is maintained on and within the bladder. In the illustrated embodiment, each expandable pressure member 87*a* is a compliant foam member having good volume efficiency, including, but not limited to, the type used in acoustical barriers and sold by E-A-R Specialty Composites of Indianapolis, Ind. The compressed foam members are elastic and act as spring members biased against fuel bladder 86*a* thus maintaining a positive pressure on the bladder. Preferably the pressure members are cut from sheet material in the shape of the interior of cartridge 39*a*. One should appreciate that other pressure members and devices can be utilized in accordance with the present invention to supply a positive pressure within the fuel bladder.

In the embodiment shown in FIG. 8, replaceable fuel cartridge 39*a* includes a cartridge port or exit port 88*a* which cooperates with a device port 127 to form a two-way valve shut-off valve 128, as shown in FIGS. 12(*a*) and 12(*b*). Two-way valve 128 is a spring-loaded device in which exit port 88*a* and includes a spring 129 that biases a valve member 130 toward a sealed position such that cartridge 39*a* is fluidly sealed when the cartridge is removed from the fuel cell assembly 31*a* but is open when the cartridge is inserted into the fuel cell assembly. Similarly, device port 127 of valve 128 includes a spring 134 that biases a valve member 135 toward a sealed position such that the fuel delivery system 40*a* of fuel cell assembly 31*a* is sealed when cartridge 39*a* is removed from the fuel cell assembly 31 a but is open when the cartridge is inserted into the fuel cell assembly. One should appreciate that other types of fluid connectors can be utilized in accordance with the present invention.

Having described certain embodiments of a cellular telephone and fuel cell assembly for portable electronic devices utilizing embodiments of fuel cells as described herein above. Attention is now directed to embodiments of a particular embodiment of a voltage regulator circuit 41 (See for example FIG. 3) referred to herein as an Interface, Control, and Regulator Circuit 41 for Fuel Cell Powered Electronic Devices.

Reference will now be made in detail to embodiments of the inventive circuit 41, examples of which are illustrated in the accompanying drawings. While the invention will be described in conjunction with the certain embodiments, it will be understood that they are not intended to limit the invention to those embodiments. On the contrary, the invention is intended to cover alternatives, modifications and equivalents, which may be included within the spirit and scope of the invention as defined by the appended claims.

In the system, method, and circuit described herein, reference is made to a fuel cell or fuel cell assembly, adapted for use with a mobile telephone such as a cellular phone or other portable electronic devices. The invention may find particular utility when used in conjunction with the fuel cell assembly and electronic device described in co-pending U.S. Provisional Patent Application Ser. No. 60/295,114, filed Jun. 1, 2001 entitled Fuel Cell Assembly for Portable Electronic Devices; herein incorporated by reference. For example, a fuel cell assembly may be used to provide a continuous source of power for a mobile telephone. One type of such telephone may typically have a power consumption ranging between about 360 mA at 3.3 V (1.2 W), when located nearest to a respective transmitter, and about 600 mA at 3.3 V (1.98 W) when located furthest from a respective transmitter.

One should appreciate, however, that a fuel cell assembly and the interface and control system, circuit, and method in accordance with the present invention can be configured to provide a continuous source of power for other portable electronic devices having various power consumption ranges and still fall within the scope of the present invention. For example, the interface and control circuit and method of control may be used in conjunction with a fuel cell assembly in accordance with the present invention can be used to power cell phones and other telecommunication devices, video and audio consumer electronics equipment, computer laptops, computer notebooks, personal digital assistants and other computing devices, geographic positioning systems (GPS's) and the like. Other uses to which the invention finds particular use includes the use of fuel cell assemblies in residential, industrial, commercial power systems and for use in locomotive power such as in automobiles. For higher power delivery applications, certain components will be modified so as to provide the required voltage or current handling capabilities. For example, capacitors, resistors, transistors, diodes, and other components may be modified in value to provide the desired operation and power handling capability.

Further more, although the inventive interface and control circuit and method find particular applicability to fuel cell powered devices, the invention is not limited to such fuel cell powered devices, but rather may have applicability to other power sources that require of benefit from the type of interface, control, regulation, and monitoring provided by the invention. It will therefore be understood to be useful when an electronic device uses any source or combination of sources of electrical energy or power. Multiple such interface and control circuits may for example be arrayed to control a multiplicity of energy sources, including for example, solar or photovoltaic sources, capacitive storage, chemical storage, fuel cell, set of batteries having similar or dissimilar voltage, current, or power delivery of charge discharge characteristics, and the like.

When a fuel cell or fuel cell assembly is involved, the fuel cell or fuel cell assembly may typically include at least two electrodes appropriate to the voltage and current generated therein. The two electrodes coupled with the fuel cell are capable of completing an electrical circuit through the inventive circuit with a load, where the load may be the cellular telephone or other electronic device to which a electric current is supplied.

In one aspect and at a conceptual level, the inventive interface and control circuit provides a voltage regulator function which includes circuit elements and an (optional) storage battery for monitoring and/or regulating voltage and/or power supplied to the portable electronic device. However, in particular embodiments of the invention, the inventive interface and control circuit provide operational features, capabilities, and advantages that go far beyond voltage, current, or power regulation.

The electronic device, such as a mobile or cellular telephone, asks for power. In fact, typical phones will accept a voltage within an acceptable range of voltages (for example a voltage between about 3.3. to 4.3 volts with nominal 3.6 operating voltage) and will then attempt to draw current appropriate to the voltage present and the power required for its then current state of operation. Power requirements may vary considerably during operations, for example from as little as one or a few milliwatts to 1.8 watts at full operating power given certain antenna distance and transmission mode characteristics. Note that these voltage and current operational characteristics derive at least in part from the fact that the devices, such as mobile phones, have been designed to operate from a battery having these characteristics.

FIG. 13 shows a portion of the battery having four terminals, a POS terminal 201, a NEG terminal 202, an ID terminal 203, and a TEMP terminal 204. These terminals connect to the phone of the type that supports both power (POS and NEG), battery type identification (ID), and battery temperature (TEMP) indicators. Other or different terminal configurations may be provided to support other devices.

The POS terminal 201 provides positive voltage and positive current to the phone and the NEG terminal 202 provides negative voltage and negative current to the phone or other electronic device. These terminals can also direct voltage and current back into the battery in the reverse direction during charging.

The Battery type indicator or ID 203 is (optionally) used by the phone so that where the phone is capable of utilizing the information, such as that it is a Lithium-ion battery versus a Nickle Metal Hydride battery, such information is available to the phone or other device. The battery temperature indicator signal available at TEMP 204 may typically be used to regulate charging (and discharge) to maintain the battery in a safe state and more particularly to prevent overheating from excessively fast charging. Structure and operation of batteries of the type having this terminal configuration are known in the art and not described in greater detail here.

A normal battery pack would provide the battery usually as a 900 to 1600 amp-hr battery and where the battery is a lithium-ion type which is susceptible to explosion under certain conditions, some type of battery protection circuit 206. For example the Texas Instrument UCC3952PW-2 is one example of a battery protection circuit 206 in the form of an integrated circuit chip that may be used. A specification sheet for the Texas Instruments UCC3952-PW2 is incorporated by reference herein.

This protection circuit 206 causes an open circuit to occur if there is an attempt to draw more current out of the battery, or an attempt to put too much current into the battery, or if not causing an open circuit then it will restrict the amount of current flow. This technique may also be applied to fuel cell based power sources. It will also cause an open circuit if there is an attempt to take the voltage above 2.4 volts, and if an attempt is made to take the voltage below 3.2 volts. Note that an important aspect of the invention is the ability to take a fuel cell voltage, either from an individual fuel cell or a combination of fuel cells, and boost the fuel cell voltage to the typically higher voltage required for electrical or electronic device operation, and to manage extraction of power from the fuel cell and manage this extraction as well as charge and discharge in a manner that is efficient and does not harm the fuel cell.

In the embodiment described herein, much of the discussion is focused on Lithium ion battery technology as it is the preferred battery technology for many mobile applications. It provides lightweight yet high-capacity storage with minimal memory effects. On the other hand, Lithium-ion is a very sensitive battery type in the sense that Li-ion battery is susceptible to short circuit, overheating, and explosion problems. Protection circuits are the standard and must be close to battery to provide safety. For Nickel Metal Hydride battery types and though such protection circuit may be provided, is not normally required. The inventive circuit and method are applicable to all types of batteries and is not limited to Lithium-ion types.

In the inventive circuit, a low value resistor R17 (0.22 ohm) 210 is provided so that the current flowing though the battery 205 can be measured. It therefore operates as a current detector within a battery current detector circuit. Note that the resistor R17 210 may be considered to be a component of the inventive battery pack of fuel cell pack or of the interface and control circuit, and in alternative embodiments may be physically implemented in either way.

Attention is now directed to the boost converter circuit U1 212, here implemented with a MAXIM MAX1703ESE chip, that is primarily responsible for boosting the fuel cell voltage to a higher voltage level and for supplying charge to capacitive and battery storage devices within the circuit. A specification sheet for the MAXIM MAX1703ESE chip is incorporated by reference herein.

The two fuel cell terminals are connected across terminals FC1 213 and FC2 214. The fuel cell provides a voltage that charges C1 (100 uF) 215 and C9 (220 uF) 216 to some voltage, this is referred to as FC+ 217. Note that in one embodiment, capacitor C1 215 is eliminated but this implementation though operational does not provide the same level of performance. FC+ can run into the 1.6 to 1.8 volt range when six fuel cells, each generating about 0.5 volts are connected in series. Fuel cell open circuit voltage (no load) may be as high as about 3.0 volts. Provision of a relatively high open circuit voltage provides enough voltage and charge so that the processor U4 218 described in greater detail herein elsewhere is able to initialize and exert control over the boost circuit 212 even if both the storage capacitors and the battery are discharged. Boost converter chip U1 212 is capable of running at a very low voltage levels with output power between about 1 to 2 watts depending upon voltages. U1 212 initially turns on a circuit through LXP (pin 14) to ground and starts circulating current through Inductor L1 (5.0 uH) 220. The current rises slowly and then the circuit is opened and the node on the U1 212 side of the inductor L1 220 quickly rises from a grounded level to a fairly high voltage level, unless clamped to prevent the voltage from rising too high. In this circuit it is clamped in two ways. First, it is clamped by D1 (MBR0520L) 221 which prevents it from going more than about 0.5 volts (one diode voltage drop) above the 3.6 volts of the supply voltage. Second, clamping is done by a FET switch inside U1 212 that is connected from LXP (synchronous bypass arrangement) connects that pin to POUT 222 and POUT 223 which folds right back into 3.6. This basically charges capacitors C2 (220 uF 10 volt) 224, C3 (220 uF 10 volt) 225, and C4 (0.22 uF 10 volt) 226. Note that two capacitors C2 224 and C3 225 in combination act as voltage (charge) storage capacitors for a 10 volt rated 440 uF capacitance which is the desired value but not readily commercially available and therefore two capacitors connected in parallel are used. A single 10 volt 220 uF capacitor, or other combination of capacitors may be used. Capacitor C4 226 is a very low value and is used to provide a high-frequency bypass to take edges off of the signal. Capacitor C4 224 is optional and may be eliminated, however, the performance of the circuit is degraded somewhat Note that in this process, current has been directed through inductor L1 220, got the inductor charged up with energy, transferred the connection of the inductor L1 220 to the output capacitors C2 224 and C3 225 (and C4 226 when present), and caused the energy to transfer to the output capacitors.

Note that low voltage at fairly high current has been used to charge storage capacitors. If this is repeated many times, the voltage will increase to a fairly high number unless some means or circuit is used to drain or otherwise control the accumulation of charge or voltage.

U1 212 terminal FB 227 is a feedback pin. The voltage on the FB pin 227 controls characteristics of the signal the directs the afore described switching of current through L1 220. The switching is altered in one or more of the timing, the shape of the waveform (pulse width modulation), that is used to control the power. For example, if the inductor L1 220 is turned on for less time it will have less power and ultimately has less power to put into the output circuit, and if not turned on at all will have no power to output. Therefore if the 3.6 gets to a desired level, and there is no draw, then the switching will turn off so that no further power is generated and the voltage on the storage capacitors C2 224 and C3 225 is maintained at the desired level.

Boost converter circuit U1 212 provides a reference REF (pin 1) 229 that is established at 1.25 volts. The goal is to get FB 227 to be 1.25 volts. If FB 227 is less than 1.25 volts, then the circuit will try to put out as much energy as it can. If FB 227 is higher than 1.25 volts it will stop putting out any energy. It knows the voltage produced by a voltage divider circuit comprised of R10 (10 ohms) 230, R13 (294 Kohms) 231, R14 (121 Kohms) 232, and R15 (4.42 Kohms) 233 and extending between the 3.6 volt supply and ground. Note that pin FB 227 sees a voltage between the series combinations of R10+R13 and R14+R15 form a voltage divider 234. This voltage divider 234 is set up so establish a voltage of about 4.2 volts. This chip tends to built the voltage to 4.2 volts so that is operation were strictly predicated on voltage, would attempt to achieve this voltage at the C2 224 and C3 225 capacitors. However, operation is not strictly predicated on voltage and there are a couple of other considerations that went into establishing the voltages.

First, the voltage is going across the Li-ion battery and its protection circuit. If the battery is discharged, down to the 3.3–3.4 volt area, and one puts 4.2 volts across it, then the battery will attempt to charge at a rate higher than it is supposed to charge. Instead, we look at the charging current sensing resistor R17 236 to build a voltage, and compare this first voltage 238 to a second voltage 239 developed by current flowing through resistors R14 240 and R15 241. The comparison is made by operational amplifier U2 (LMV921M7) 242. Operational amplifier 242 may conveniently be implemented with a LMV921M7 operational amplifier made by National Semiconductor, a copy of the specification sheet for such device is incorporated by reference herein.

If the voltage at the positive input 243 of the operational amplifier exceeds the voltage at the negative input 244, then the operational amplifier output 245 will increase and feed current to diode D2 (BAS16HT1) 246, and satisfy a current need to keep the feedback point FB 227 at 1.25 volts and require less current to come down through R10 230 and R13 231. Diode D2 246 may conveniently be implemented using a BAS16HT1 diode made by ON Semiconductor, and a copy of the specification for such diode is incorporated by reference herein. Therefore the voltage of output of the U1 chip 212 or set-point will be decreased down from 4.2 volts to the 3.5 volt range. This will lessen the tendency to charge (or overcharge) the battery.

It is noted that this presents a novel use of a chip (U1) 212 that is normally used as a fixed voltage source, and implement some feedback in that would limit the voltage so that the current charging the battery would not be excessive.

Although the U1 chip 212 includes a feedback pin FB 227, the use of the feedback input and the circuitry that generates the feedback voltage are different than might conventionally be used. Recall the use of operational amplifier U2 242 and resistor R16 247 and diode D2 246 in conjunction with the voltage across R17 236 and the voltage across the top of R15 233 within the serial combination of R14+R15 in the voltage divider circuit, effectively form a feedback control signal generating circuit that provides an input to the FB pin 227 of U1 212 circuit. The voltage at R15 233 gets too high if too much current is flowing through the battery and the feedback will lessen this so that the battery is not overcharged. If on the other hand, somebody tries to use the telephone (or other electronic device) creating need for transmit power (or other higher than normal power) rather than a standby type mode, the circuit will continue to try to put out more and more power at what ever voltage is convenient to try to keep the battery from being overcharged to supply the phone. The modulator will turn on for a longer time to try to supply the needs of the phone and to charge the battery.

A fuel-cell voltage divider circuit off of the fuel cell (extending between FC1 213 and FC2 214 at ground) comprised of R6 (10 ohm) 251, R5 (9.53 Kohm) 252, R4 (6.49 Kohm) 253, R3 (16.9 Kohm) 25 and R2 (127 Kohm) 255. A tap at VDIV3 256 between R3 and R4 is connected to the Ain input (pin 6) 257 of Boost circuit chip U1 212. This Ain 257 or VDIV3 256 signal or voltage becomes a sampling of the voltage of the fuel cell. If the fuel cell voltage drops much below about 1.3 volts, this Ain pin 257 will come up against the 1.25 reference voltage within U1. Ain 257 is an amplifier input, and A0 258 will start to go up and detect that Ain 257 is beginning to get to close to the reference point voltage. In response to this condition, A0 258 acting as a current sink, when it sinks current it starts to turn on transistor Q2 (MGSF1P02EL) 258. Q2 258 may for example be implemented with a MGSF1P02EL power MOSFET made by ON Semiconductor, and a copy of the specification for such device is incorporated by reference herein. Note that transistor Q2 258 is in parallel to resistor R13 231, which is a component of the earlier described voltage divider circuit 234. Operation of the transistor Q2 258 in conjunction with resistor R13 231 results in the feedback FB pin 227 of boost circuit 212 to be satisfied and stop trying to put out anymore power or voltage. The fuel cell can be controlled so that the fuel cell output voltage does not drop too far in voltage so as to maintain advantageous power curve relationship.

A typical fuel cell power output curve is generally in the form of a pseudo parabola as illustrated in FIG. 15. It is desirable that operation be maintain on the left side of the peak and not on the downward slope to the right of the peak.

Note that the battery is essentially in parallel with storage capacitors C2 224, C3 225, and C4 226. If the circuit stops charging energy through U1 212 to charge C2 224, C3 225, and C4 226 so as not to pull down the voltage of the fuel cell anymore, then if the battery has a higher potential it will discharge and supply energy to the phone. It is the equivalent of a logical OR, such that the voltage building circuit, storage capacitors, and battery are tiled together and the one that has the most energy at the time will supply the phone or other electronic device's power needs. Therefore battery supplies the energy if the fuel cells cannot provide it. During some operational modes, it is expected that the fuel cells, storage capacitors, and batteries may contribute power.

Note that in one embodiment of the invention the battery is physically smaller and has a smaller capacity that a conventional battery because the fuel cell effectively provides the additional power. For example, in some conventional cellular telephones, a Li-ion battery having a capacity of between 900–1600 amp-hrs may typically be provided. By comparison, a Li-ion battery having only a 300 amp-hr capacity is used with the fuel cell. Battery is smaller than normal because you would prefer to rely on the fuel cells. In some instances, the battery is needed to supplement power during typical high power transmit mode operation. The battery is then recharged from the fuel cell during standby operation.

Other embodiments, may use larger or smaller batteries, and in one embodiment the battery is very small, such as under 100 amp-hr and only used to buffer charging of the fuel cells. In yet a further embodiment, the battery is eliminated completely, being replaced by high capacity storage capacitors. Of course the need and or sizing of batteries and storage capacitors will depend upon at least the power requirements of the device and the required operating time, as well as the required operating duration in any high power consumption mode, and the acceptable recovery time.

Having now described the manner in which power or energy flows through the inventive circuit and is regulated, attention is now directed to aspects of processor or microcontroller U4 218 which performs additional control functions.

Processor or microcontroller U4 (ATtiny15L) 218 operates primarily as a housekeeper, looking at the voltages, primarily at the fuel cell voltage, and deciding when to turn the converter U1 212 on and when to turn it off. Converter U1 212 has an ON pin 16 260 of the converter to make it run or to make it not run. If the processor U4 218 does not sense certain conditions it will not turn the converter U1 on. U4 218 uses the SVFC lead (U4 pin 3) 261 which is a sample of the fuel cell voltage, to decide whether it should or should not operate the device.

During many phases of operation, processor U4 218 is not required as non-processor hardware provides sufficient control with the afore described feedback to maintain operation. Not operating processor U4 218 is advantageous when possible as it consumes very little power while in a sleep mode. Processor power saving conventions and sleep modes are known in the art and not described in detail here, but typically involve slowing or stopping a processor clock and/or lowering a processor core voltage.

Note that in the circuit embodiment of FIG. 13, a variety of test pins (TP) and pogo pins (PG) are illustrated. These pins are conveniently provided for monitoring and testing circuits, particularly during prototype development, but are not required in a commercial embodiment of the circuit. Other pins are conveniently provided for loading software or revisions to software into the processor and the like. For example, an SDI pin is a serial data in pin that permits in-circuit programming of the processor. PG15 provides a lead for a serial instruction in line signal. PG11 provides a pin for a serial clock in signal. Other optional though desirable pins are shown in the figures.

Attention is now directed to processor, microprocessor, or microcontroller U4 218. The U4 218 processor is conveniently implemented with an ATMEL ATtiny 15L microcontroller. An ATMEL specification for this microcontroller is incorporated by reference herein. This processor supports execution of commands or instruction that modify or control the operation of the processor. Several procedures implemented as software and/or firmware are now described relative to FIGS. 16–24. Means are provided to input the computer program code into the processor from ports provided on a printed circuit board on which components of the inventive circuit are attached, including processor U4.

Primary among the programs is a MAIN procedure or routine which executes continuously within the processor while it is in an active or awake state. The awake state may be achieved using a Comp signal (pin 6) which connects to a comparator in the processor that trips at about 1.35 volts. If it trips, it wakes up the microprocessor U4 so that the code begins to run. Hardware continues to run and generates an interrupt to wake up the processor.

An embodiment of the MAIN procedure or routine is illustrated in the flow-chart diagram of FIG. 14 and now described. Note that all of the procedures executing on processors, microprocessors, or other logic described herein may conveniently be implemented as computer program instructions as software or firmware.

MAIN 301 begins after processor U4 218 initializes (INITS) itself it jumps into its main flow loop and continues to execute this loop continuously while it is awake, that is until it enters sleep mode. Upon first executing MAIN 301, two voltage readings for Vout 302 and VFC 303 are taken and stored using the ADC routine. More particularly, ADC Channel 0 (Vout) and ADC Channel 3 (VFC) performed, including measuring the voltages and converting them into digital numbers, and storing them in memory or register. These voltages are used in making further decisions as to the condition of elements of the system and any corrective action that may be required or desired. Note that the measurements are taken upon each execution of the main loop so that this monitoring is more of less continuous while the processor is awake.

Next, a determination is made in MAIN010 304 as to whether the boost circuit U1 is in an ON state or an OFF state. (Note that the nomenclature "MAINXXX" refers to labels within the processor code but they are conveniently referred to as routines here where actually they are portions of the MAIN procedure.) ON and OFF conditions are described in turn beginning with the OFF condition.

If the boost circuit U1 212 is in an off condition, then MAIN100 305 is executed to Flash the LED indicating a possible problem condition. Then a series of determinations are made relative to the fuel cell voltage (VFC) as the answer to these queries indicate proper operation, operation that is problematic but that may be remedied, or conditions that suggest that a problem cannot be remedied. Four software VFC levels are used, and some modification of these levels may be accomplished under hardware and/or software control to fine tune operation of the system. Level 1 refers to a VFC of approximately 2.4 volts, level 2 refers to a voltage of about 1.5 volts, level 3 refers to a voltage of about 1.2 volts, and level 4 refers to a voltage of about 1.1 volts.

After flashing the LED, the program determines if the fuel cell voltage VFC (MAIN110) 306 is above (high) or below (low) the level 1 voltage (here 2.4 volts). If the fuel cell voltage is above 2.4 volts (above level 1) without load, then MAIN140 307 is executed to perform a fuel cell load test where an incremental load is applied to the fuel cell to see what happens to its output voltage. If the fuel cell has inadequate fuel to generate power (or has otherwise failed in some manner) it will not be able to maintain its output voltage and will fail the test. On the other hand if it is fueled and otherwise operational, the load test should be passed. If the load test (MAIN 150) 308 is passed or OK, then the boots converter circuit 212 is started or turned on by routine MAIN160 309, if the load test was not completed OK, then the program returns to execute another loop of MAIN to start the process again. In either the case that the load test was OK or not OK, the MAIN loop is executed again 310, the fuel cell converter being turned on under one condition and not turned on under the other condition.

The load test is performed to determine if fuel cell is capable of sustaining operation. Note, that the load test and/or the MAIN140 307 routine desirably has a counter in it so that the load test is not actually performed with each loop of the program which would result in load testing every few milliseconds, but rather the load test is performed every ten seconds or so when load testing is appropriate.

If when performing MAIN110 306, the fuel cell voltage was determined to be lower than level 1 (2.4 volts), then the MAIN120 311 routine is executed and a determination is made as to whether VFC is above or below the level 3 voltage (1.2 volts). If the inquiry and comparison indicates that VFC is above Level 3, then no action is taken and MAIN is executed again. However, if VFC is below Level 3, then the MAIN130 312 routine is executed making an inquiry as to whether the processor U4 should keep running or place itself into a power-conserving substantially inactive sleep mode. The processor may be programmed in various ways to provide for either continued monitoring and attempts to operate the fuel cell to generate power (that will consume power at a faster rate) or to place the processor into a sleep mode thereby conserving power until the fuel cell is refueled or other corrective action is taken. In one embodiment, when VFC is below a level 3 voltage threshold, the processor is placed into a sleep mode until triggered to wake up by a hardware comparator trip circuit at a voltage somewhere between level 2 and Level 3. Therefore, in at least one embodiment, if VFC is below level 3 then the MAIN200 314 routine is executed to place itself into a sleep mode since it cannot recover from the then fuel cell condition. MAIN200 314 provides procedures and functions that setup the processor for sleep, maintain a low power consumption sleep mode, and reset the processor after the processor resumes from sleep. If no corrective action is taken to restore fuel cell operation, such as by refueling, eventually the processor or microcontroller U4 will stop because there is no voltage to even operate it.

Returning to execution of MAIN010 304, if fuel is present or fuel is provided after the processor went into the sleep state and then resumed from sleep state after a corrective refueling, the state of the boost converter circuit 212 may be on but more typically will be off. The initialization routine will place the boost converter into an off state so that it will be in an off state when it is first put into service. If for some reason the processor goes into a sleep state when the boost converter circuit is in an on state then it will still be on when and if the processor U4 218 wakes up again. If processor sleep is caused by running out of fuel and for example, enters from MAIN130 312 (boost circuit was off) then it will still be off. These various situations and the state of the boost circuit when resuming or awakening from sleep are illustrated in the diagram as in general the boost circuit will be in the state it was in when the processor went to sleep or will be off. Returning to execution of MAIN010 304, MAIN020 315 determines if VFC is above or below the level 3 voltage. If VFC is above level 3 (high), then the MAIN060 316 routine determines if VFC is above or below the level 2 voltage. If VFC is above both 1.2 volts (Level 3) and above 1.5 volts (level 2) then the program executing within the processor decides that operation of the fuel cell and boost circuit are sufficiently stable that it does not need to monitor or act and executed MAIN200 314 to place itself into a sleep mode, as already described. Note, that although the processor could remain active but this would consume power for a housekeeping type function that is not required. Recall that during a certain range of operating parameters, hardware components are provided that include feedback control elements to control and regulate operation of the boost converter circuit and other elements of the inventive interface and control circuits.

Returning again to the comparison performed by MAIN020 315 to determine if VFC is above or below the level 3 voltage, if the determination indicates that VFC is below level 3 (low), then routine MAIN030 317 causes the LED to flash indicating a problem condition. The number or duration of flashing may be selected to suit operational preferences and a desire to conserve power. Next, routine MAIN040 compares VFC with the level 4 voltage (1.1 volts). Of VFC is above level 4 (high) then the program returns to MAIN 310,301 and executes the loop again, the voltage still being sufficient to support operation. However, if VFC is below level 4, routine MAIN050 319 is executed to stop the boot converter U1 as under this condition it appears that the fuel cell has insufficient fuel to generate even a minimal voltage or there is some other problem. When the next loop of MAIN is executed, the boot converter circuit will be in the OFF state and MAIN will execute beginning with MAIN100 as described herein above.

FIG. 24 provides a listing of exemplary computer code suitable for operation in the U4 processor generally corresponding to the description in the referenced flow-chart diagrams.

Attention is now directed to several miscellaneous routines that are called by or within MAIN.

The Reset 320 routine (See FIG. 16) executes when the processor is first started, such as during power-up, and initializes the processor and by virtue of the processors connections to other components of the interface and control circuit, initializes and resets the circuit generally.

The Time Clock Interrupt Service Routine 323 (TIC ISR) (See FIG. 17) is set up to generate an interrupt in some predefined time increment, such as a 0.1 second increment and generate a count of such increments, and these increments are counted until a desired time is obtained. In general, a count is placed in a memory storage or register and the count is decremented to zero. This reduces the number of comparisons that are needed to determine if the desired time has expired. Conventional up counters may alternatively be used but are not preferred. For example, to provide a 10 second timer, 100 of the 0.1 second clock pulses are counted. TIC ISR is used for example by the Flash routine described below to control flashing of an LED. The TIC ISR is executed in response to receipt of an interrupt. The TIC routine has two routines so that separate counters may be used, TIC A and TIC B. Status is saved in a register, then a determination is made as to whether the Time Clock A (TIC A) is zero or not zero, if it is not zero meaning there is a value stored there, then the TIC A counter is decremented, and then TIC B is tested to determine if it is zero in analogous manner. If TIC A was zero, TIC B is tested in the same way. In other words, the TIC ISR basically says that there has been an interrupt, decrement the counter if the counter has something in it (e.g. non-zero contents) otherwise do nothing, restore status, and go back to the place in the code where you were when you received the interrupt. A single Time Clock may be sufficient in many circumstances.

The Timer 0 Overflow Interrupt Service Routine 331 (T0 Overflow ISR) (See FIG. 18) is a simple interrupt service routine in that the mere fact that the interrupt occurred and was handled by this ISR is sufficient to accomplish its purpose. Therefore there are no instructions within the TO Overflow ISR.

The Compare Interrupt Service Routine 333 (See FIG. 19) wakes up the processor from a power conserving sleep mode. This is an interrupt function, when an interrupt is encountered in the processor, there are eight vectors at the top of the code that can be set up to send various pieces of code, (See code in FIG. 24) which show ISR vectors. The compare ISR causes the processor U4 to come away and execute the next instruction from the point where it was sleeping. This means that it will resume and execute instructions until it goes to sleep again. For example, see Sleep block in MAIN200 for the location of the point where the processor enters sleep and resumes from sleep.

The Flash 335 routine (See FIG. 20) is used in a couple of places in MAIN, is concerned with how flash works. Flash is called whenever MAIN comes to a Flash routine. Flash asks if it is time to flash yet and looks at its TIC counter to determine if it is zero or not. If it is not zero, it goes back without doing anything, that is it does not flash, but if it determines that it is time to flash, it flashes (unless there is another condition that precludes it from flashing.) The LED is turned on for a predetermined period of time (e.g. 0.04 sec), then turned off. The flash counter is then incremented. Desirably, the duration that it flashes is limited so that if no one sees the flashing within some predetermined number of flashes or period of time, the flashing will stop so as to minimize power consumption.

The Load Test 343 routine (See FIG. 21) is a routine or procedure that load tests the fuel cell. A determination is made as to whether it is time to load test the fuel cell, if it is not time, the routine returns without testing. If it is time to load test the fuel cell, then the routine applies a load to the fuel cell, waits a period of time (e.g. 0.02 sec), read ADC voltage on Channel 3 for VFC, removes the load, check for a change in VFC to see if the fuel cell passed or din not pass the load test, a sets up a flag indicating the status of the test (passed or not passed), and then returns.

The Analog to Digital Converter (ADC) 353 routine (See FIG. 22) is responsible for reading a VFC voltage, converting it to a digital value or number, and returning the number to the requester. ADC may typically read the Vout and VFC voltages within the MAIN routine.

A Wait 356 routine (See FIG. 23) is implemented as a quick subroutine to hold until event is completed. This is accomplished by setting up Timer 0 and sleep until done.

FIG. 24 shows exemplary computer software code for use with an embodiment of the invention utilizing a microprocessor to accomplish a portion of the control in accordance with the invention.

FIG. 25 shows an exemplary state diagram 360 for operation of the inventive circuit in accordance with one embodiment of the invention including a Power-up reset routine 361. This diagram shows aspects of the invention in which a hardware state machine will run the boost converter without processor control.

While operation has been described relative to a particular logic, it will be understood by those workers having ordinary skill in the art that different logic may be applied to achieve the same or comparable control, that different decision and comparison logic may be implemented, and that more, fewer, or different voltage levels may be tested to provide comparable or at least acceptable operation.

When cartridge 39*a* is inserted in fuel cell assembly 31*a* and exit port 88*a* is engaged with device port 127, fuel bladder 86*a* is fluidly connected to the fuel chamber of anode plate 37*a* via fuel delivery system 40*a* in a manner similar to that described above with respect to fuel delivery system 40. Fuel flow from fuel cartridge 39*a* toward the fuel chamber anode plate 37*a* is facilitated by the positive pressure maintained on the fuel bladder 86*a*. In operation and use, fuel cell assembly 31*a* is used in substantially the same manner as fuel cell assembly 31 discussed above.

In another embodiment of the present invention, as shown in FIG. 11, a spring-loaded replaceable cartridge 39*b* includes an alternative configuration for maintaining a positive pressure on fuel bladder 86*b*. In particular, cartridge 39*b* includes a pair of compression plates 138, 139 which are biased toward one another and against fuel bladder 86*b* by a pair of leaf springs 140, 141. One should appreciate that other mechanical pressure members can be utilized to provide a positive pressure on and within the fuel bladder in accordance with the present invention.

In many respects the modifications of the various figures resemble those of preceding modifications and the same reference numerals followed by subscripts a and b designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A direct methanol fuel cell assembly for a portable electronic device comprising:

a membrane electrode assembly including an anode, a cathode, and a polymer electrolyte membrane having a fuel side and an oxygen side;

an anode plate including a fuel chamber fluidly connected to said fuel side of said membrane;

a removable fuel cartridge fluidly connected to said fuel chamber; and a cathode plate including an oxygen port extending therethrough for providing air to said oxygen side of said membrane;

wherein said anode plate includes a post extending through said fuel chamber toward said anode for biasing said anode into contact with said membrane.

2. The direct methanol fuel cell assembly of claim 1 further comprising:

a removable fuel cartridge for a direct methanol fuel cell assembly comprising:

an expandable fuel bladder for receiving liquid methanol fuel;

an expandable pressure member in contact with said bladder for maintaining a positive pressure on said bladder; and a sealable exit port in fluid communication with said bladder.

3. The removable fuel cartridge of claim 2 wherein said expandable fuel bladder is formed of a sheet plastic material.

4. The removable fuel cartridge of claim 3 wherein said sheet plastic material is substantially impervious to methanol.

5. The removable fuel cartridge of claim 2 wherein said expandable pressure member is a compressed foam member.

6. The removable fuel cartridge of claim 2 wherein said sealable exit port includes a septum.

7. A fuel cell assembly for a portable electronic device comprising:

membrane electrode assembly including an anode, a cathode, and a polymer electrolyte membrane having a fuel side and an oxygen side;

a removable fuel cartridge including an expandable fuel bladder for receiving liquid fuel, an expandable pressure member in contact with said bladder for maintaining a positive pressure on said bladder, and a sealable exit port in fluid communication with said bladder; and a fuel delivery system for delivering fuel from said cartridge to said fuel side of said membrane, said fluid delivery system engageable with said port for fluidly connecting said bladder to said fuel side of said membrane;

wherein said cathode elate forms an enclosure having a recess receiving said membrane electrode assembly, said anode plate, and said removable fuel cartridge.

8. The fuel cell assembly of claim 7 further comprising an enclosure adapted to engage a cellular phone body of a cellular phone, said fuel cell assembly adapted to replace a battery for the cellular phone.

9. The fuel cell assembly of claim 7 wherein said polymer electrolyte membrane electrode assembly comprises first and second catalysts positioned respectively on said fuel side and said oxygen side of said membrane.

10. The fuel cell assembly of claim 9 wherein said anode is in electrical communication with said first catalyst and said cathode is in electrical communication with said second catalyst.

11. The fuel cell assembly of claim 7 wherein said wherein said expandable fuel bladder is formed of a sheet plastic material, said sheet plastic material is impervious to methanol.

12. The fuel cell assembly of claim 7 wherein said expandable pressure member is a compressed foam member.

13. The fuel cell assembly of claim 7 wherein said sealable exit port includes a septum.

14. The fuel cell assembly of claim 7 wherein said fuel delivery system comprises a needle insertable into said sealable exit port.

15. The fuel cell assembly of claim 7 wherein said fuel delivery system comprises a manifold including a one-way valve for preventing fuel from flowing through said fluid delivery system away from said fuel side of said membrane.

16. The direct methanol fuel cell assembly of claim 1 wherein said polymer electrolyte membrane electrode assembly further comprises first and second catalysts positioned respectively on said fuel side and said oxygen side of said membrane, said anode is in electrical communication with said first catalyst and said cathode is in electrical communication with said second catalyst.

17. The direct methanol fuel cell assembly of claim 1 wherein said anode plate comprises an exhaust port for ejecting carbon dioxide from said fuel chamber.

18. The direct methanol fuel cell assembly of claim 1 further comprising:

a fuel delivery system for delivering fuel from said cartridge to said fuel side of said membrane;

said removable fuel cartridge including an expandable fuel bladder for receiving liquid fuel, an expandable pressure member in contact with said bladder for maintaining a positive pressure on said bladder, and a sealable exit port in fluid communication with said bladder;

wherein said fluid delivery system is engageable with said port for fluidly connecting said bladder to said fuel side of said membrane.

19. A direct methanol fuel cell assembly for a portable electronic device comprising;

a membrane electrode assembly including an anode, a cathode, and a polymer electrolyte membrane having a fuel side and an oxygen side;

an anode plate including a fuel chamber fluidly connected to said fuel side of said membrane;

a removable fuel cartridge fluidly connected to said fuel chamber; and a cathode plate including an oxygen port extending therethrough for providing air to said oxygen side of said membrane;

wherein said cathode plate forms an enclosure having a recess receiving said membrane electrode assembly, said anode plate, and said removable fuel cartridge.

20. The direct methanol fuel cell assembly of claim 19 wherein said enclosure includes an air groove formed on an outer surface of said enclosure, said oxygen port extending from a base of said groove into said recess for providing air to said oxygen side of said membrane.

21. The direct methanol fuel cell assembly of claim 19 further comprising:

a power pack specifically adapted to replace a battery for a cellular phone having a cellular phone body, said power pack comprising:

a fuel cell assembly;

a removable fuel cartridge for providing fuel to said fuel cell assembly, said fuel cartridge including an expandable fuel bladder for receiving liquid fuel, an expandable pressure member in contact with said bladder for maintaining a positive pressure on said bladder, and a sealable exit port in fluid communication with said bladder; and a housing adapted to removably engage the cellular phone body, said housing enclosing said fuel cell assembly and said fuel cartridge.

22. A power pack according to claim 21 wherein said fuel cartridge is specifically adapted for use with a power pack specifically designed for a specific model of a cellular phone.

* * * * *